US012337258B2

(12) United States Patent
Belknap, Jr. et al.

(10) Patent No.: US 12,337,258 B2
(45) Date of Patent: Jun. 24, 2025

(54) TOY FIXTURE AND PRINTING SYSTEM

(71) Applicant: Hasbro, Inc., Pawtucket, RI (US)

(72) Inventors: William Howard Lyon Belknap, Jr., Mansfield, MA (US); Robert Chester Mackowiak, Oakland, RI (US); Patrick Marr, Franklin, MA (US); Daniel Anthony D'Amico, Uxbridge, MA (US); Tyler Nelson, Cranston, RI (US)

(73) Assignee: Hasbro, Inc., Pawtucket, RI (US)

( * ) Notice: Subject to any disclaimer, the term of this patent is extended or adjusted under 35 U.S.C. 154(b) by 0 days.

(21) Appl. No.: 18/476,490

(22) Filed: Sep. 28, 2023

(65) Prior Publication Data

US 2024/0108994 A1    Apr. 4, 2024

Related U.S. Application Data

(60) Provisional application No. 63/412,124, filed on Sep. 30, 2022, provisional application No. 63/432,256, filed on Dec. 13, 2022.

(51) Int. Cl.
*A63H 9/00* (2006.01)
*B33Y 40/20* (2020.01)
(Continued)

(52) U.S. Cl.
CPC ............. *A63H 9/00* (2013.01); *B41F 17/30* (2013.01); *B41J 3/4073* (2013.01); *B41J 3/40731* (2020.08); *B33Y 40/20* (2020.01)

(58) Field of Classification Search
CPC . A63H 9/00; B33Y 40/20; B41F 17/30; B41F 3/407; B41F 3/4073; B41F 3/40731; B29C 64/00; B29C 64/30; B29C 64/40
(Continued)

(56) References Cited

U.S. PATENT DOCUMENTS 5,234,636 A    8/1993 Hull et al.
5,740,051 A    4/1998 Sanders, Jr.
(Continued)

FOREIGN PATENT DOCUMENTS

JP    2006035562 A    2/2006
JP    2014097217 A    5/2014
(Continued)

OTHER PUBLICATIONS

Denis Curt, Extended European Search Report issued in counterpart application EP App. No. 23200462 on Oct. 7, 2024, 5 pages total.
(Continued)

*Primary Examiner* — Leslie J Evanisko
*Assistant Examiner* — Thomas Ray Knief
(74) *Attorney, Agent, or Firm* — DiBerardino McGovern IP Group LLC

(57) ABSTRACT

A printing system includes: a plurality of unitary objects each having a unique identification code, a plurality of fixtures arranged on a base, and a printer controller. Each unitary object includes a uniquely-shaped three-dimensional body fixed to a plate by a connection mechanism. Each fixture includes: a fixture block defining a printing opening; and a plate guide defined in the fixture block and configured to receive the plate. A target region of the three-dimensional body is aligned within the printing opening of the fixture block when the plate is fixed within the plate guide. The printer controller is configured to: detect the unique identification code of each unitary object; and control an ink dispenser to print a unique topographical design on each aligned target region of each three-dimensional body, the unique topographical design being associated with the detected unique identification code.

25 Claims, 17 Drawing Sheets

(51) Int. Cl.
B41F 17/30 (2006.01)
B41J 3/407 (2006.01)

(58) Field of Classification Search
USPC .............................................. 446/268; 101/35
See application file for complete search history.

(56) References Cited

U.S. PATENT DOCUMENTS

| | | | |
|---|---|---|---|
| 6,220,689 | B1 | 4/2001 | Sturgeon |
| 6,418,843 | B1 | 7/2002 | Givler |
| 6,578,276 | B2 | 6/2003 | Patton |
| 6,923,115 | B1 | 8/2005 | Litscher et al. |
| 7,255,551 | B2 | 8/2007 | Taylor et al. |
| 9,114,645 | B2 * | 8/2015 | Gerber .................... B41J 11/06 |
| 9,456,884 | B2 | 10/2016 | Uckelmann et al. |
| 9,703,898 | B2 | 7/2017 | Zenere |
| 9,889,607 | B2 | 2/2018 | Haider et al. |
| 10,081,132 | B2 | 9/2018 | Dawson et al. |
| 10,226,919 | B2 | 3/2019 | Ederer |
| 10,308,037 | B2 | 6/2019 | Johnson et al. |
| 10,319,153 | B2 | 6/2019 | Nagahari et al. |
| 10,606,244 | B2 | 3/2020 | Ho et al. |
| 11,235,529 | B2 | 2/2022 | Tetteroo et al. |
| 11,312,049 | B2 | 4/2022 | Daniels et al. |
| 2001/0003871 | A1 | 6/2001 | Patton et al. |
| 2006/0003111 | A1 | 1/2006 | Tseng |
| 2011/0312049 | A1 | 12/2011 | Osterhout et al. |
| 2013/0108726 | A1 | 5/2013 | Uckelmann et al. |
| 2013/0333579 | A1 | 12/2013 | Gerber et al. |
| 2015/0165675 | A1 | 6/2015 | Dawson et al. |
| 2015/0239270 | A1 | 8/2015 | Attia |
| 2015/0352789 | A1 | 12/2015 | Haider et al. |
| 2015/0375451 | A1 | 12/2015 | Voris et al. |
| 2018/0061140 | A1 | 3/2018 | Nagahari et al. |
| 2018/0307208 | A1 | 10/2018 | Ho et al. |
| 2019/0351612 | A1 | 11/2019 | Huang et al. |
| 2020/0316832 | A1 | 10/2020 | Daniels et al. |
| 2020/0324470 | A1 | 10/2020 | Walker |
| 2021/0060836 | A1 | 3/2021 | Node et al. |
| 2021/0060856 | A1 | 3/2021 | Zhang et al. |
| 2021/0114298 | A1 | 4/2021 | Santiago et al. |
| 2021/0402480 | A1 | 12/2021 | Sweetland |
| 2022/0009164 | A1 | 1/2022 | Jacimovic et al. |
| 2022/0040912 | A1 | 2/2022 | Zenou et al. |

FOREIGN PATENT DOCUMENTS

| | | |
|---|---|---|
| JP | 2019142020 A | 8/2019 |
| WO | 2021096904 A1 | 5/2021 |

OTHER PUBLICATIONS

Terlizzi, Mike, "How Jigs & Fixtures Can Improve UV Print Quality", Accessed Feb. 17, 2022, Accessible at: https://itnh.com/blog/jigs-fixtures-uv-inkjet/, 8 pages.

"Industrial Printing Equipment: Pad Printing & Digital Printing—Inkcups," Inkcups Now, Accessed Feb. 17, 2022, Accessible at: https://www.inkcups.com/industrial-printing-equipment/, 10 pages.

"We Design & Manufacture Custom Jigs for Mimaki UJF 3042, 6042, AND 7151 Ink Jet Printers," Inkjetjigs.com, 2019, 4 pages.

* cited by examiner

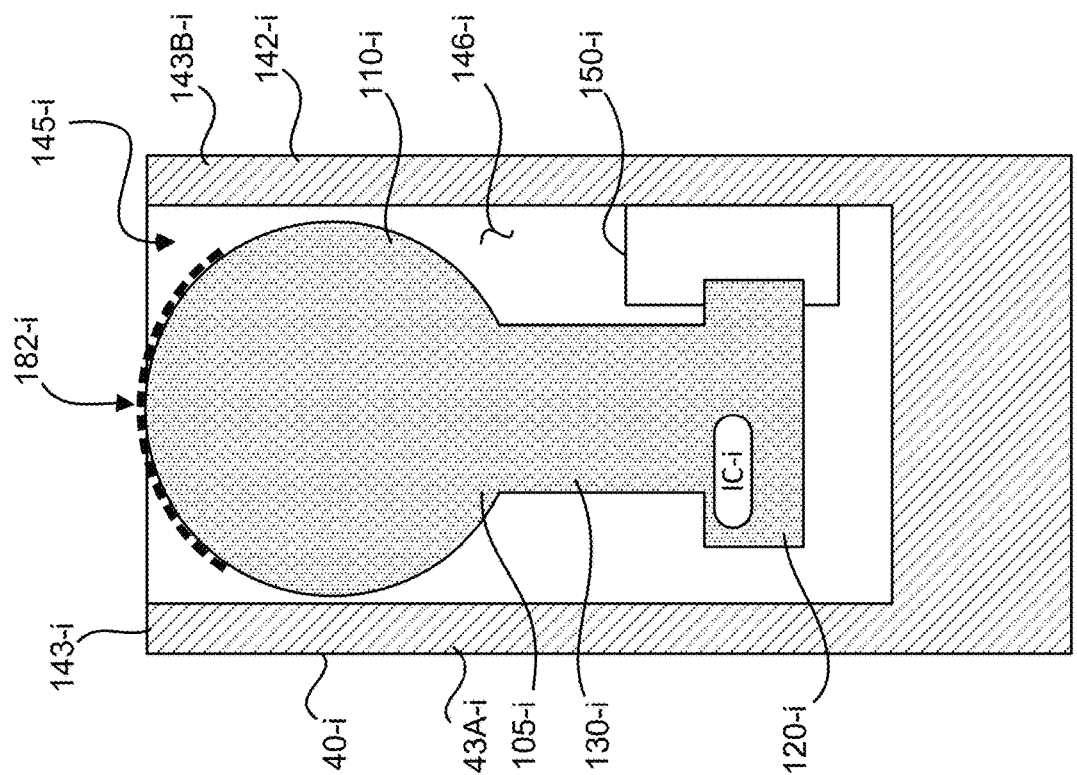
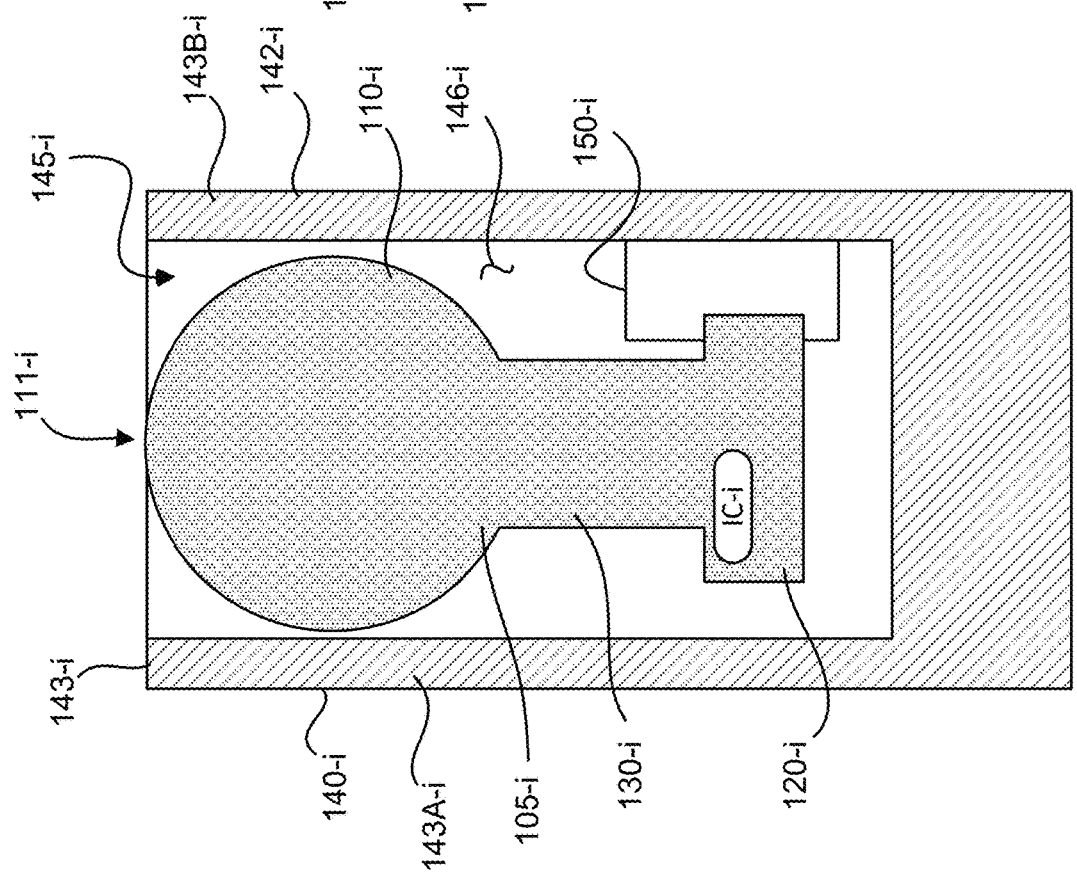
Fig. 1C
Fig. 1B

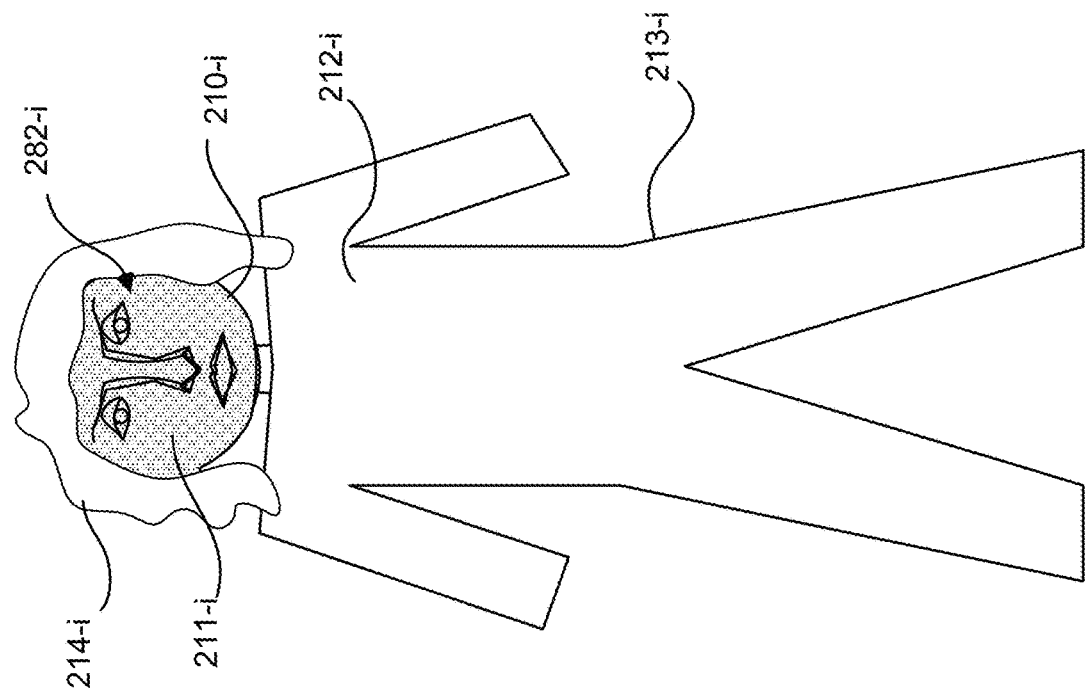
Fig. 2
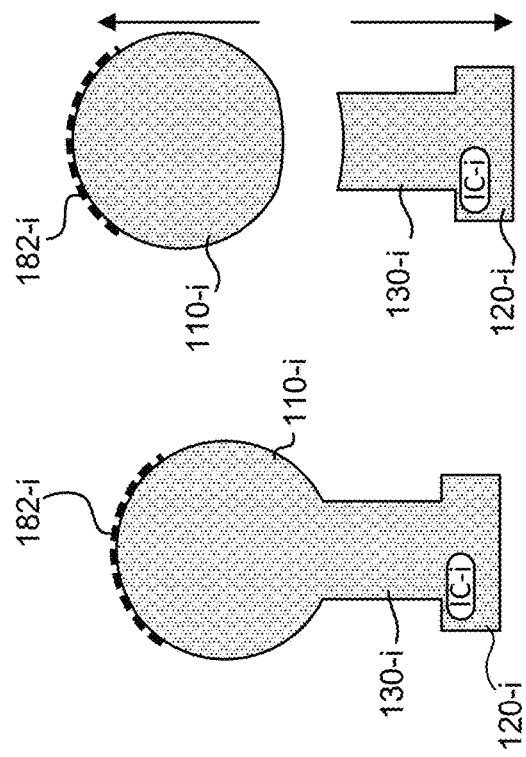
Fig. 1E
Fig. 1D

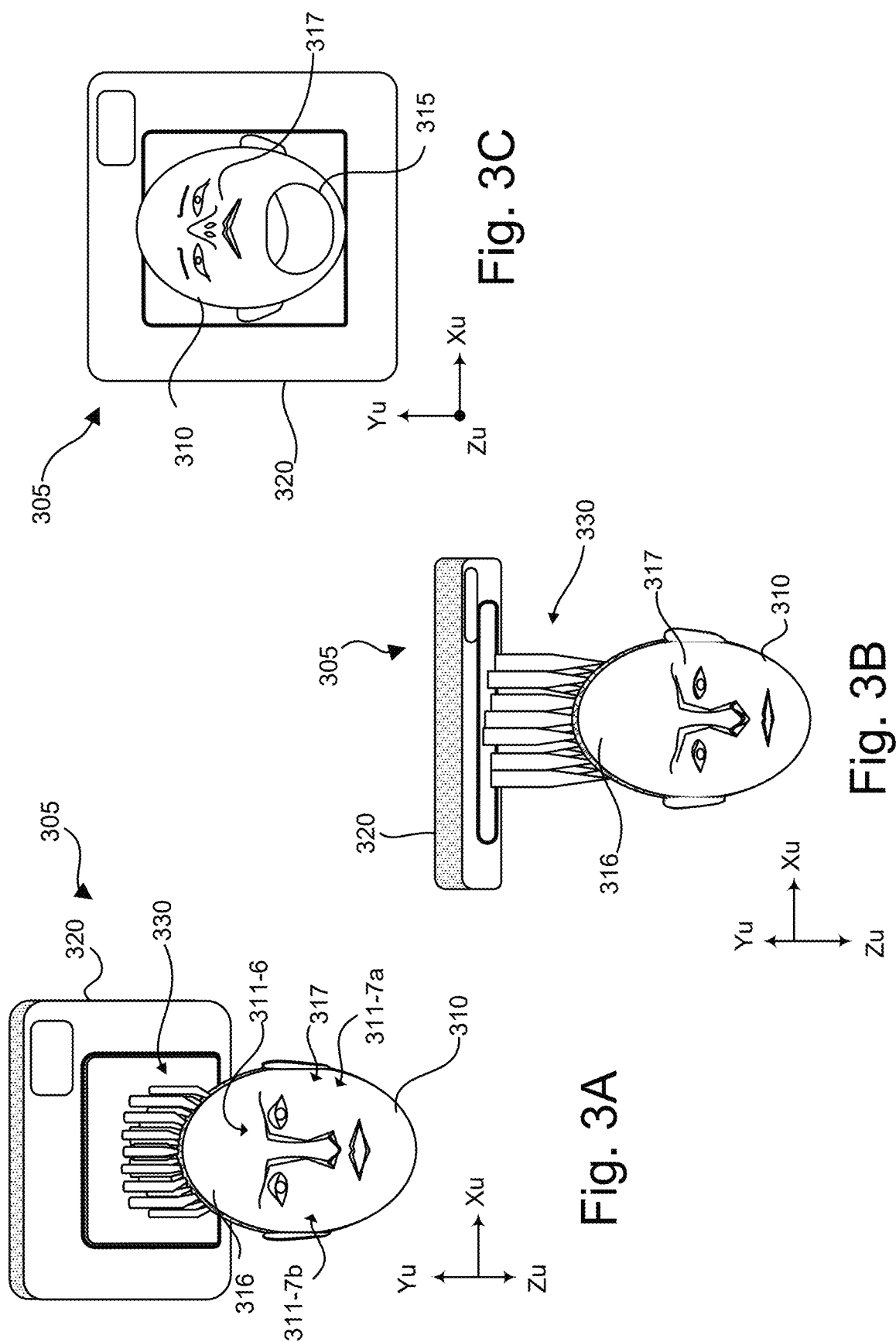

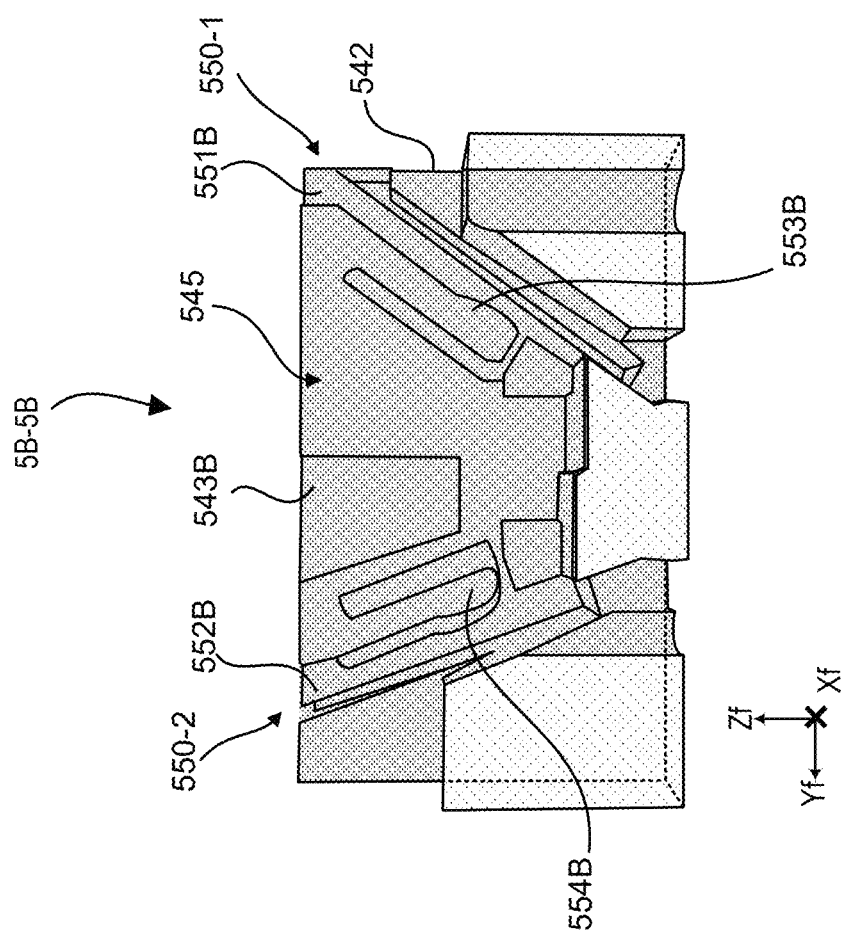
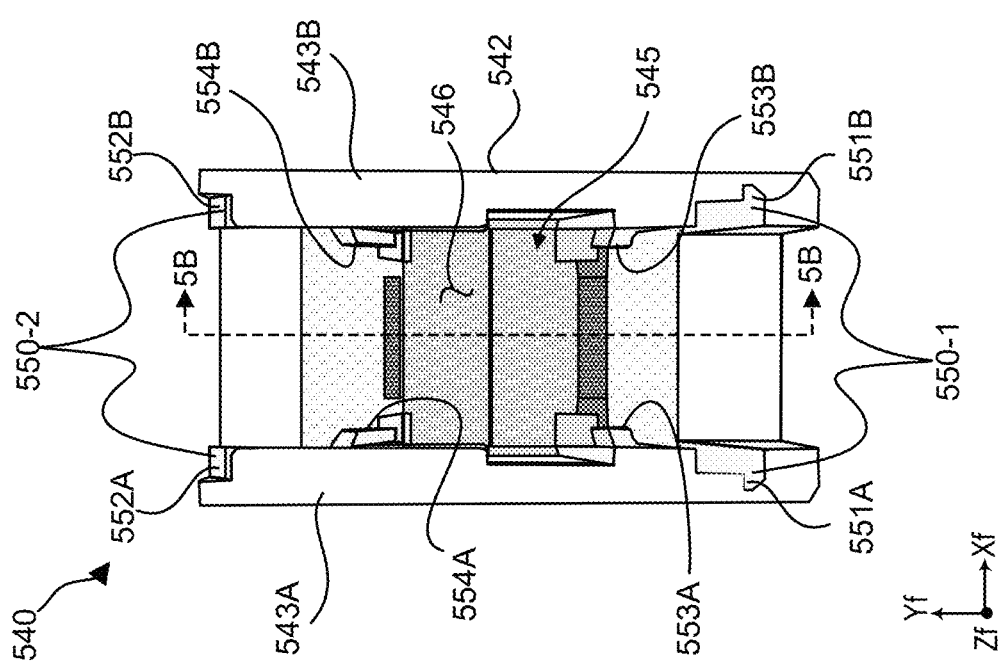
Fig. 5B
Fig. 5A

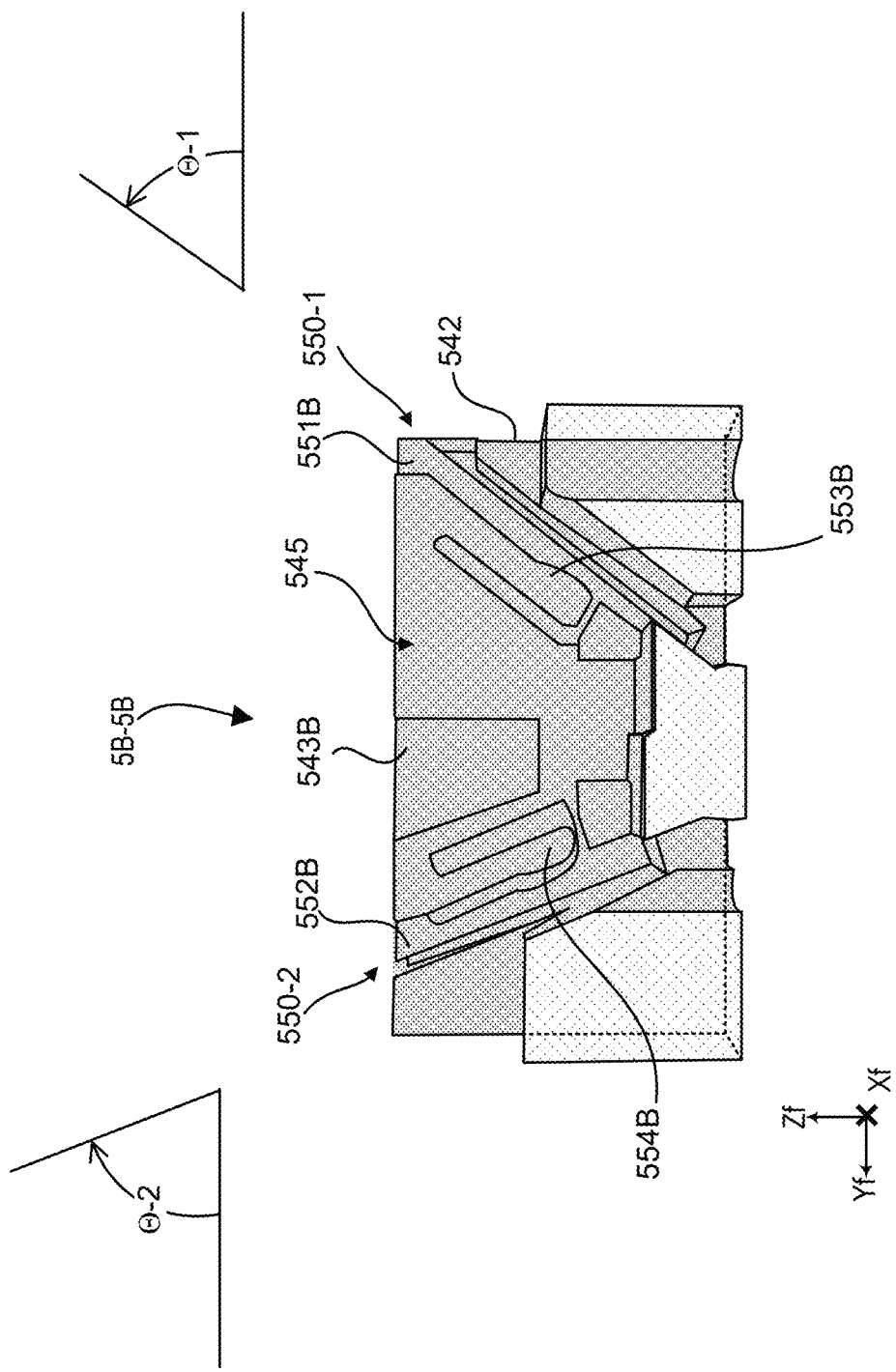

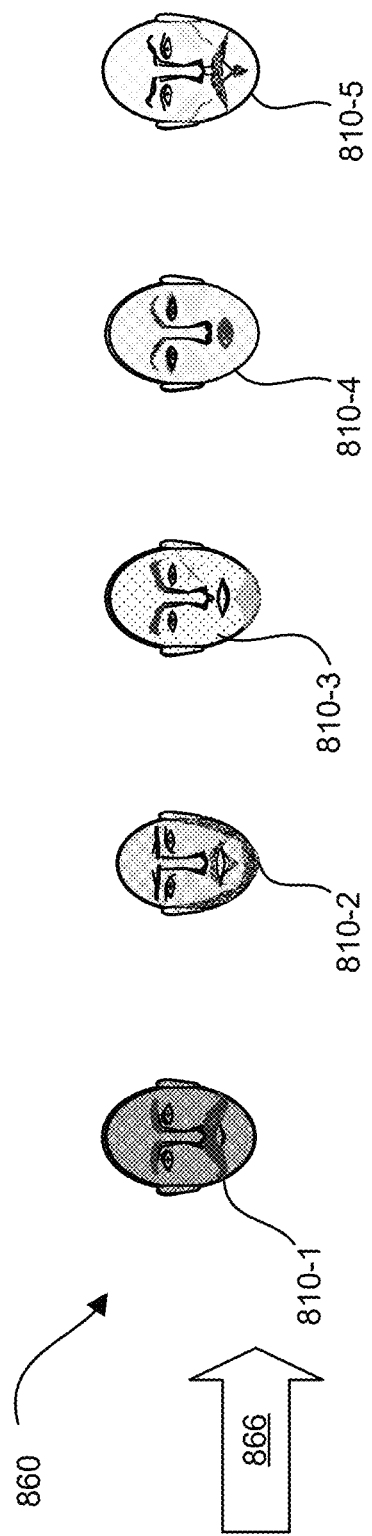

TOY FIXTURE AND PRINTING SYSTEM

CROSS REFERENCE TO RELATED APPLICATIONS

This application claims the benefit of U.S. Provisional Application No. 63/412,124, filed on Sep. 30, 2022 and titled TOY FIXTURE AND PRINTING SYSTEM, and U.S. Provisional Application No. 63/432,256, filed on Dec. 13, 2022 and titled TOY FIXTURE AND PRINTING SYSTEM. Both of these applications are incorporated herein by reference in their entirety.

TECHNICAL FIELD

This disclosure relates to a toy fixture for holding a three-dimensional body and a printing system configured to decorate the three-dimensional body.

BACKGROUND

Dolls and action figures can be customized to resemble particular people. Technology including scanners and three-dimensional printers can be used for customized heads and bodies. Facial features can be printed onto the head by using ink jets.

SUMMARY

In some general aspects, a printing system includes: a plurality of unitary objects each having a unique identification code, a plurality of fixtures arranged on a base, and a printer controller. Each unitary object includes a uniquely-shaped three-dimensional body fixed to a plate by a connection mechanism. Each fixture includes: a fixture block defining a printing opening; and a plate guide defined in the fixture block and configured to receive the plate. A target region of the three-dimensional body is aligned within the printing opening of the fixture block when the plate is fixed within the plate guide. The printer controller is configured to: detect the unique identification code of each unitary object; and control an ink dispenser to print a unique topographical design on each aligned target region of each three-dimensional body, the unique topographical design being associated with the detected unique identification code.

Implementations can include one or more of the following features. For example, the unique identification code can be a unique combination of numbers, letters, alphanumeric characters, characters, symbols, or matrix barcodes.

The three-dimensional body can be a three-dimensional head of a toy figure. The three-dimensional head can include one or more unique facial and/or topographical features. The three-dimensional head can be defined by a three-dimensional head base region, a three-dimensional scalp region, and a three-dimensional face region; and the connection mechanism can extend from the scalp region or the head base region.

The connection mechanism can include a plurality of posts. Each post can extend from a first post end to a second post end, with the first post end fixed at a location of the plate and the second post end detachably fixed to a location of the body. The second post end can be formed with a tapered shape that permits the second post end to be detached from the body. The tip of the tapered shape can be smaller (in diameter or width) than about 1 millimeter (mm), smaller than 0.5 mm, smaller than 0.1 mm, or smaller than 0.05 mm. Each post can include a main post that extends from the first post end to the tapered shape along a post axis, and each tapered shape can be angled relative to the post axis of the main post, the relative angle between the tapered shape and the post axis depending on the normal to the surface of the body at which the second post end is fixed.

The printer controller being configured to control the ink dispenser can include registering a distance between the ink dispenser and a registration location in the printing opening and/or registering a registration area on the target region of each body. When each plate is received in its respective plate guide, a registration region or area of the body can be aligned with the registration location in the printing opening. The registration locations in the printing openings of the fixture blocks can be at the same location relative to the ink dispenser when aligned with the ink dispenser during printing.

Each connection mechanism can include a plurality of posts and each body can be fixed to its respective plate by the posts, and the number of posts in the connection mechanism can be between 10 and 50.

The plate guide can be configured to receive the plate in one or more orientations. An orientation of the body in the fixture can be defined by an orientation of its associated plate received in the plate guide, the body orientation determining which one or more target regions of the body are aligned within the printing opening of the fixture block.

The unique identification code can be a visible code located on the plate of each unitary object. The plate of each unitary object can be associated with a unique manufacturing recipe that comprises information about the hair associated with the three-dimensional body, information about a scale and/or geometry of the three-dimensional body, information about a toy figure to which the three-dimensional body is fixed, and the unique identification code. The base can include a base identification code, the base identification code including each unique identification code of each unitary object received within each fixture arranged on the base. The printer controller can be configured to detect the base identification code and control the ink dispenser to print a unique topographical design associated with each unique identification code included in the base identification code. The unique topographical design can be based on a two-dimensional print design. Each three-dimensional body can be defined by a scale percentage that is between a minimum scale percentage of 0% and a maximum scale percentage. The maximum scale percentage can be 18%, 20%, 25%, 30%, or 35%. The printer controller can be configured to detect the unique identification code of the unitary object when the plate associated with the unitary object is received in the fixture block and the fixture is arranged on the base.

In other general aspects, a fixture includes: a fixture block defining a printing opening positioned between two opposing walls; and a plurality of plate guides defined in the walls. Each plate guide is defined in a different portion of the fixture block. Each plate guide in the fixture defines a registration location, and, when a plate of a unitary object is fixed to a plate guide, a registration region of a three-dimensional body fixed to the plate is aligned with the registration location of that plate guide.

Implementations can include one or more of the following features. For example, the registration region or area of the three-dimensional body that is fixed to the plate can depend on which plate guide the plate is fixed to. Each plate guide can include a slot defined in each of the two opposing walls. Each opposing wall can include a biasing device configured to fix the plate within the slot of that opposing wall. The fixture can be configured to receive unitary objects formed with different shapes, different geometries, and different dimensions.

In other general aspects, a method is performed for designing a three-dimensional body. The method includes: forming a unitary object including the three-dimensional body fixed to a plate by a connection mechanism; fixing the plate to a plate guide defined in a fixture block such that a target region of the three-dimensional body is positioned in a printing opening of the fixture block and a registration region of the three-dimensional body is aligned with a registration location within the printing opening that is defined by the plate guide; detecting a unique identification code of the unitary object; printing a unique topographical design on the target region of the three-dimensional body positioned in the printing opening of the fixture block, the unique topographical design associated with the detected unique identification code; and, when the printing is completed, removing the three-dimensional body from the plate by disconnecting the connection mechanism from the three-dimensional body.

Implementations can include one or more of the following features. For example, the connection mechanism can be disconnected from the three-dimensional body by disconnecting a plurality of posts from the three-dimensional body.

In other general aspects, a method is performed for designing a plurality of uniquely-shaped three-dimensional bodies. The method includes: forming a plurality of unitary objects, each unitary object including one of the uniquely-shaped three-dimensional bodies fixed to a plate by a connection mechanism and each unitary object associated with a unique identification code; fixing each unitary object to a respective fixture including fixing the plate of the unitary object to a plate guide defined in the fixture such that a target region of the three-dimensional body is positioned in a printing opening of the fixture and a registration region of the three-dimensional body is aligned with a registration location within the printing opening that is defined by the plate guide; arranging the fixtures on a base; detecting the identification code of each unitary object; and printing a unique topographical design on the target region of each three-dimensional body positioned in the printing opening of its respective fixture, the unique topographical design associated with the detected unique identification code of the unitary object that includes that three-dimensional body.

Implementations can include one or more of the following features. For example, the method can further include, when the printing of the unique topographical design for each three-dimensional body arranged in the fixtures on the base is completed, removing each three-dimensional body from its respective plate by disconnecting the connection mechanism from the three-dimensional body. The identification code of each unitary object can be detected or read by scanning a visual code on the plate of the unitary object or scanning a visual code on the base. The fixtures can be arranged on the base by arranging the fixtures such that the registration locations in the printing openings of the fixture blocks are at the same location relative to an ink dispenser that prints the unique topographical designs.

In other general aspects, a method includes: producing a plurality of unitary objects, each unitary object including a three-dimensional body that is fixed to a plate by a connection mechanism, at least two of the unitary objects having distinctly-shaped three-dimensional bodies and associated connection mechanisms that are shaped based on the distinct shapes of the respective three-dimensional bodies; fixing the unitary objects to respective identical fixtures and arranging the fixtures on a base; and printing a topographical design on a target region of each three-dimensional body fixed within the fixture arranged on the base. Each registration location for topographical printing on each of the three-dimensional bodies is positioned in the same two-dimensional printing plane when the fixtures are arranged on the base.

Implementations can include one or more of the following features. For example, the plurality of unitary objects can be produced by forming the entire unitary object including the three-dimensional body, the connection mechanism, and the plate using an additive manufacturing process. Forming each unitary object can be based on a scan of a person's face using a mobile device. The connection mechanism can be defined by one or more dimensions that are different based on the distinctly-shaped three-dimensional body to which the connection mechanism is fixed. The plurality of unitary objects can be formed by forming the at least two distinctly-shaped unitary objects by forming the respective distinctly-shaped three-dimensional bodies with different scales and/or different geometries.

DESCRIPTION OF DRAWINGS

FIG. 1B is a schematic block diagram showing details of a unitary object fixed to a fixture, the unitary object including a three-dimensional body connected to a plate by way of a connection mechanism and the plate being fixed to the fixture;

FIG. 1C is a schematic block diagram of the unitary object of FIG. 1B after the ink dispenser of FIG. 1A has printed a unique topographical design on the three-dimensional body of the unitary object;

FIG. 1D is a schematic block diagram of the unitary object of FIG. 1C removed from its fixture;

FIG. 1E is a schematic block diagram of the separation of the three-dimensional body from the plate and connection mechanism of the unitary object of FIG. 1D;

FIG. 2 is a schematic diagram of an implementation of the three-dimensional body of FIG. 1E configured as a head and being attached to a torso of a toy figure and a wig;

FIG. 3A is a perspective view of an implementation of a unitary object of FIGS. 1A-2 in which the three-dimensional body is shaped like a head;

FIG. 3B is a perspective view of the unitary object of FIG. 3A and rotated about the local Xu axis;

FIG. 3C is a plan view of the unitary object of FIG. 3A and rotated about the local Xu axis;

FIG. 5A is a plan view of an implementation of the fixture of FIGS. 1A-1C looking down through a printing opening;

FIG. 5B is a cross-sectional view of the fixture of FIG. 5A taken along plane 5A-5A;

FIG. 5C is the cross-sectional view of the fixture of FIG. 5B showing the angles of plate guides in walls of the fixture;

FIG. 8C is a schematic diagram of steps of the procedure of FIG. 8A in which the three-dimensional bodies (heads) have been disconnected from the respective connection mechanism and plate.

DETAILED DESCRIPTION

Figure 1A:
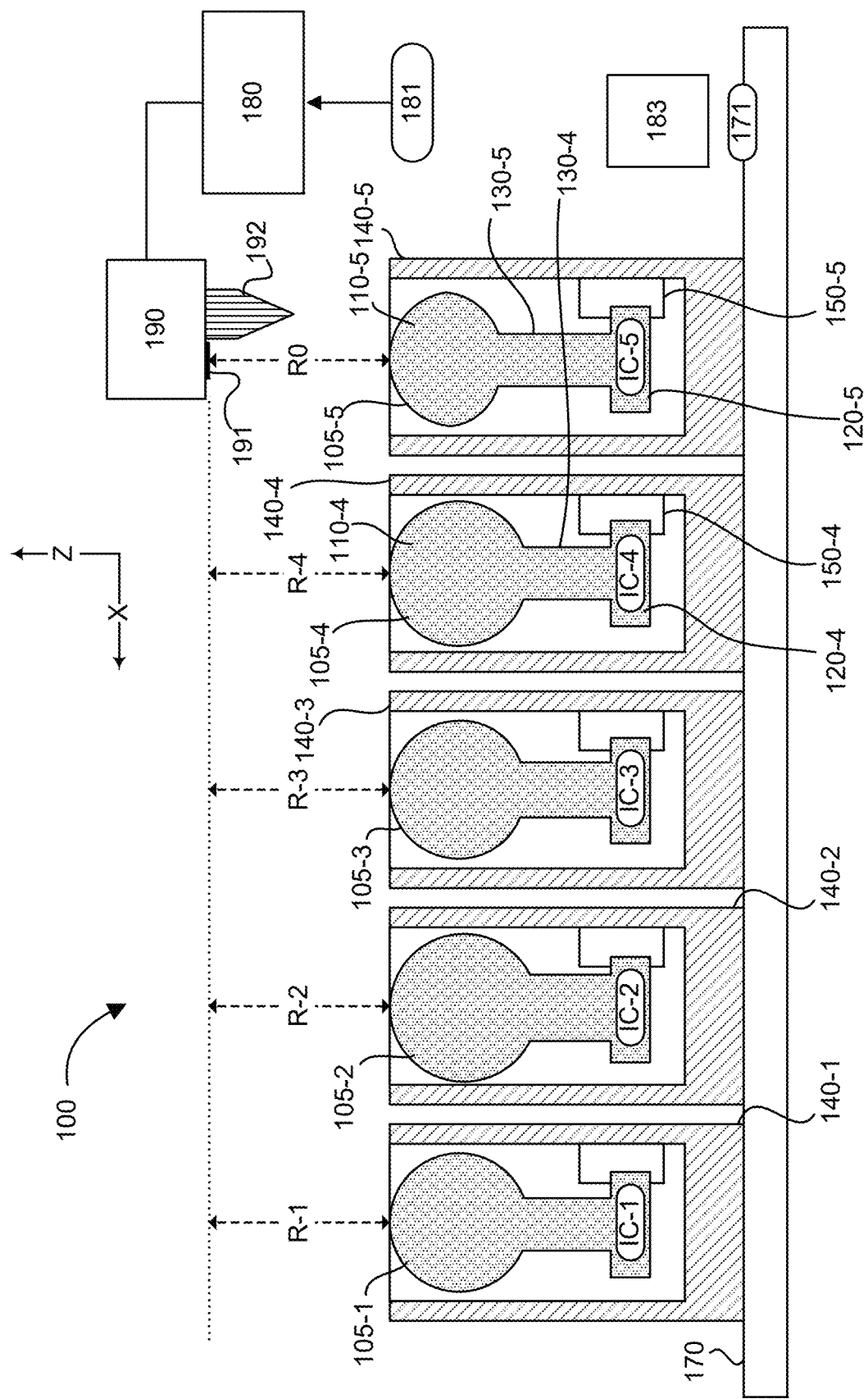
FIG. 1A is a schematic block diagram of a printing system including a plurality of unitary objects each associated with a unique identification code and each fixed in a fixture, with all the fixtures arranged on a base, and a printer controller configured to read or detect each identification code and instruct an ink dispenser to print a unique topographical design on each unitary object.
Figure 3D:
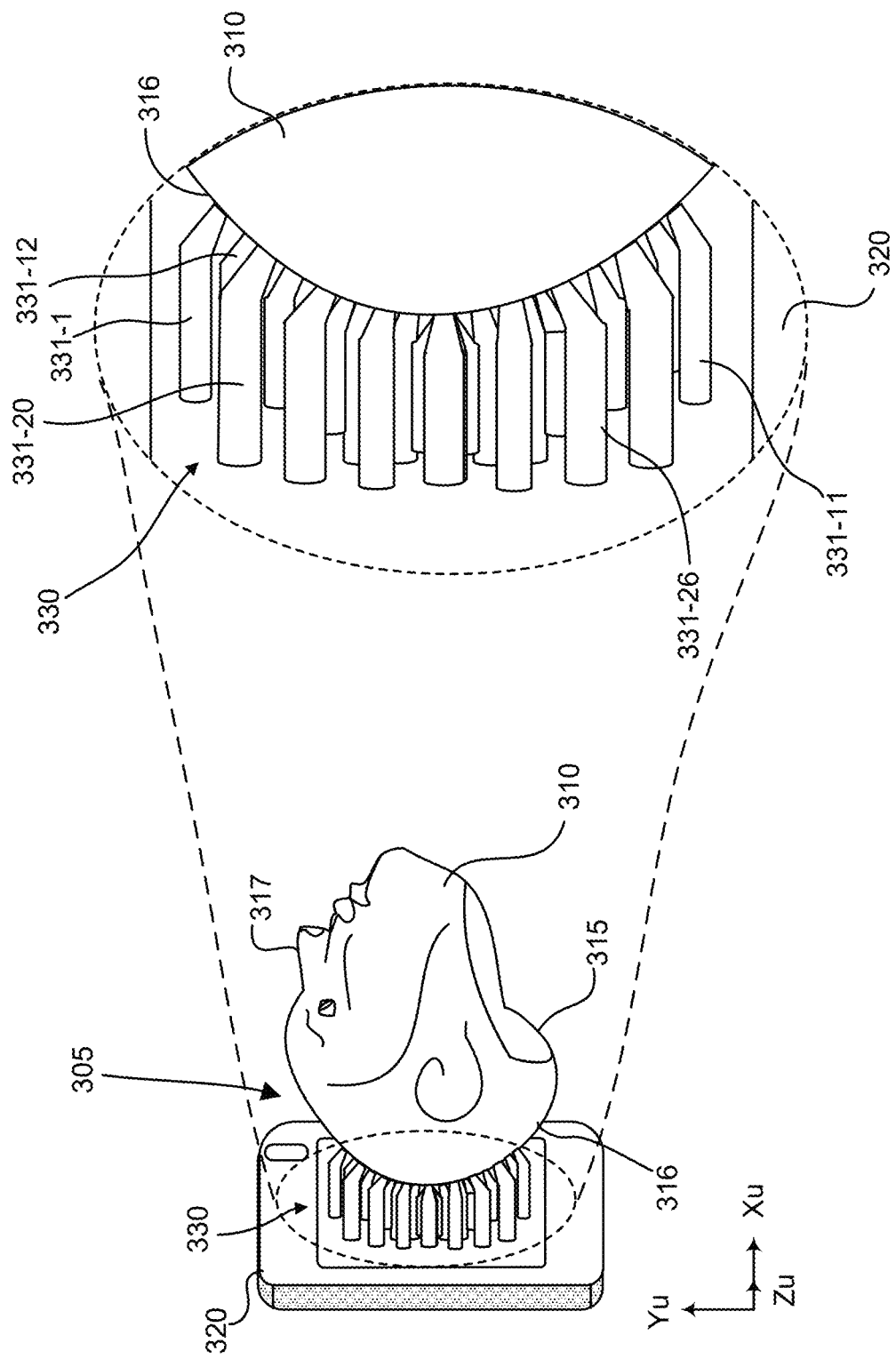
FIG. 3D is a perspective view of the unitary object of FIG. 3A with an inset view showing details of the connection mechanism.

Referring to FIG. 1A, a printing system 100 is shown. The printing system 100 includes, among other features, a plurality of unitary objects 105-$i$, a plurality of fixtures 140-$i$ arranged on a base 170, and a printer controller 180 in communication with an ink-dispenser 190, where i corresponds to a set of integers [1, 2, . . . I] and I is a number greater than 1. In the implementation of FIG. 1A, there are five fixtures 140-1, 140-2, 140-3, 140-4, 140-5 and five unitary objects 105-1, 105-2, 105-3, 105-4, 105-5. The printing system 100 can include fewer than or more than five fixtures and five unitary objects. In general, all of the fixtures 140-$i$ can be identical while the unitary objects 105-$i$ can have different and unique portions.

As also shown in greater detail in FIG. 1B, each unitary object 105-$i$ is defined by and is associated with a unique identification code IC-$i$. The unique identification code IC-$i$ can be any unique combination of numbers, letters, alpha-numeric characters, characters, symbols, or matrix barcodes. As discussed below, the unique identification code IC-$i$ can be created as a part of a recipe when the design for a toy that includes a three-dimensional body 110-$i$ is initially created. Such a recipe can include information about the scale and/or geometry of the body 110-$i$, information about another component or accessories that attach to the three-dimensional body 110-$i$ after the body 110-$i$ is disconnected from its connection mechanism 130-$i$. The unique identification code IC-$i$ can be a visible code located on the exterior of a plate 120-$i$ of the unitary object 105-$i$.

Each unitary object 105-$i$ includes a uniquely-shaped three-dimensional body 110-$i$ fixed to a plate 120-$i$ by a connection mechanism 130-$i$. The object 105-$i$ is unitary in that the combination of the three-dimensional body 110-$i$, the plate 120-$i$, and the connection mechanism 130-$i$ are undivided. They can be formed all together using a single process such as by molding or by additive manufacturing. Nevertheless, as discussed below, the three-dimensional body 110-$i$ is able to be disconnected from the connection mechanism 130-$i$. The unitary object 105-$i$ can be made of any suitable solid material such as, for example, a resin or a polymer.

Each fixture 140-$i$ includes a fixture block 142-$i$ that defines a printing opening 145-$i$. Each fixture 140-$i$ includes a plate guide 150-$i$ defined in the fixture block 142-$i$. The plate guide 150-$i$ is configured to receive the plate 120-$i$ of the unitary object 105-$i$ so as to fix the unitary object 105-$i$ to or within the fixture 140-$i$. A target region 111-$i$ of the body 110-$i$ is aligned within the printing opening 145-$i$ of the fixture block 142-$i$ when the plate 120-$i$ is affixed to (such as fixed to or within) the plate guide 150-$i$. The target region 111-$i$ of the body 110-$i$ is aligned within the printing opening 145-$i$ if it is generally in the vicinity of an edge 143-$i$ of the fixture block 142-$i$ facing the ink dispenser 190. This alignment enables the target region 111-$i$ to be accurately decorated with ink from the ink dispenser 190, as discussed below. While a single target region 111-$i$ of the body 110-$i$ is shown in FIGS. 1A-1C, it is possible for the body 110-$i$ to include a plurality of target regions 111-$i$. Such implementations are discussed below with reference to FIGS. 6A-8B.

The printer controller 180 is configured to detect the unique identification code IC-$i$ of each unitary object 105-$i$. In particular, the printer controller 180 is configured to receive the data 181 that includes all of the identification codes IC-$i$ from each of the unitary objects 105-$i$. The printer controller 180 is also configured to control the ink dispenser 190 to print a unique topographical design 182-$i$ (FIG. 1C, which shows the unitary object 105-$i$ after it has been printed) on the aligned target region 111-$i$ of each three-dimensional body 110-$i$ of each unitary object 105-$i$. The unique topographical design 182-$i$ is associated with the detected unique identification code IC-$i$. Thus, the topographical design 182-1 applied to the target region 111-1 of the three-dimensional body 110-1 is different or distinct from the topographical design 182-2 applied to the target region 111-2 of the three-dimensional body 110-2. The topographical design 182-$i$ is selected to correspond to the design appropriate for the three-dimensional body 110-$i$ and this correspondence is determined from the detected unique identification code IC-$i$ of that three-dimensional body 110-$i$. The topographical design 182-$i$ can be based on a two-dimensional print design that is stored within memory and accessible by the printer controller 180.

The ink dispenser 190 and the base 170 are in a controllable and adjustable position relative to each other; for example, the ink dispenser 190 can move along the X and/or Y direction relative to the base 170. The base 170 can move along the Z direction. Generally, the position of the base 170 can be adjusted and fixed prior to the ink dispenser 190 executing a print instruction. The ink dispenser 190 is configured to apply ink or paint 192 to each target region 111-*i* of each three-dimensional body 110-*i* in accordance with the topographical printing design 182-*i* associated with that body 110-*i*. The topographical design 182-*i* corresponds to the ink that is dispensed from the ink dispenser 190, and therefore the topographical design 182-*i* conforms to the three-dimensional contours of the target region 111-*i* of the body 110-*i*. The topographical design 182-*i* can be made up of different topographical design elements such as, in the example in which the body 110-*i* is a head and the target region 111-*i* is a face, an element for eyebrows, an element for lips, and an element for eyes.

The unitary object 105-*i* is mounted to the fixture 140-*i* by way of the plate 120-*i* being fixed to the plate guide 150-*i*. There is no connection between the associated three-dimensional body 110-*i* and the fixture 140-*i*. The unitary object 105-*i* is inserted into a cavity 146-*i* of the fixture block 142-*i* by way of the printing opening 145-*i*. In order to fix the unitary object 105-*i* to the fixture 140-*i*, the plate 120-*i* is affixed to the plate guide 150-*i*. Each fixture block 142-*i* can include two opposing walls 143A-*i* and 143B-*i*. The plate guide 150-*i* can be associated with or a part of one or more of the opposing walls 143A-*i* and 143B-*i*. Because the fixtures 140-*i* are identical in design, the plate guides 150-*i* are all positioned at the same location along a Z axis when the fixtures 140-*i* are fixed to the base 170. Accordingly, the plates 120-*i* are also positioned at the same location along the Z axis when the unitary objects 105-*i* are mounted to the fixtures 140-*i* and the fixtures 140-*i* are fixed to the base 170.

As discussed in greater detail below, and as shown in FIGS. 1D-1E, once the unique topographical design 182-*i* is applied to the target region 111-*i* of the three-dimensional body 110-*i* (that is, the printing steps performed by the ink dispenser 190 are completed), the unitary object 105-*i* is removed from the cavity 146-*i* (by way of the printing opening 145-*i*) of the fixture 140-*i*, as shown in FIG. 1D. The plate 120-*i* and the three-dimensional body 110-*i* are separated from each other by, for example, disconnecting the connection mechanism 130-*i* from the three-dimensional body 110-*i*, as shown in FIG. 1E. Up to this point, the unique identification code IC-i has remained fixed to the three-dimensional body 110-*i* so that it is possible to identify the design of the three-dimensional body 110-*i*. An implementation 210-*i* of the three-dimensional body 110-*i* that has been disconnected from its associated connection mechanism 130-*i* is shown in FIG. 2. In this implementation, the body 210-*i* is a three-dimensional head, the target region 211-*i* includes the three-dimensional facial features such as the contours of the nose, lips, eyes, brows, cheeks, and the unique topographical design 282-*i* includes two-dimensional and topographically-printed facial features such as the colors and patterns of the eyes, cheeks, brows, lips, beard (if one is present), mustache (if one is present), or scars (if present). Other external features can be added to or connected to the three-dimensional head 210-*i* post ink processing by the ink dispenser 190. With reference to the example of FIG. 2, the head 210-*i* is attached to a torso 212-*i* of a toy FIG. 213-*i*. Additionally, a wig 214-*i* is attached or fixed to a scalp area of the head 210-*i*.

As discussed above, the printer controller 180 is configured to control the ink dispenser 190 to print the unique topographical design 182-*i* on each aligned target region 111-*i* of each three-dimensional body 110-*i*. The ink dispenser 190 generally moves in a plane that is perpendicular to the Z axis. For example, the ink dispenser 190 moves along a direction parallel with an X axis as it moves from one target region 111-*i* to the next target region 111-*i* to be printed. In order for the ink dispenser 190 to print the topographical design 182-*i* accurately to the aligned target region 111-*i* of each body 110-*i*, the printer controller 180 registers a distance between the ink dispenser 190 and a primary registration location RO in one of the printing openings 145-*i*. In the example of FIG. 1A, the primary registration location RO is established between a marker 191 and a feature on the aligned target region 111-5 of the body 110-5. Additionally, as discussed above, each target region 111-*i* of each body 110-*i* is aligned within the printing opening 145-*i* of the fixture block 142-*i* when the plate 120-*i* is affixed to (such as fixed to or within) the plate guide 150-*i*. Moreover, each target region 111-*i* of each body 110-*i* is aligned such that a localized registration location R-i is the same for all of the target regions 111-*i* held in the respective fixtures 140-*i* on the base 170. The primary registration location RO and the localized registration locations R-i are measured along the Z axis that is defined as the axis between the target region 111-*i* and the marker 191 associated with the ink dispenser 190 when the marker 191 is placed directly above the target region 111-*i*. In this way, because the value of RO is the same as the values of each R-i, the printer controller 180 only needs to register the primary registration location RO (the distance between the ink dispenser 190 and the marker 191) before instructing the ink dispenser 190 to print the unique topographical design 182-*i* on each aligned target region 111-*i*. This alignment enables each of the target regions 111-*i* to be accurately decorated with ink from the ink dispenser 190 even though the printer controller 180 registers a single primary registration location RO.

As discussed, each target region 111-*i* of each body 110-*i* is aligned within the printing opening 145-*i* of the fixture block 142-*i* when the plate 120-*i* is affixed to (such as fixed to or within) the plate guide 150-*i* and each target region 111-*i* of each body 110-*i* is aligned such that the localized registration location R-i is the same for all of the target regions 111-*i* held in the respective fixtures 140-*i* on the base 170. The unitary objects 105-*i* are designed in a way that enables this uniformity when printing despite that the three-dimensional bodies 110-*i* have unique scales and/or geometries. Specifically, referring to FIG. 1A, because each body 110-*i* has a unique scale and/or geometry, physical properties such as scale and geometry of each connection mechanism 130-*i* are adjusted when each unitary object 105-*i* is initially formed to account for the differences in the scale and geometry of each body 110-*i*. As discussed above, the combination of the three-dimensional body 110-*i*, the plate 120-*i*, and the connection mechanism 130-*i* are formed all together using a single process such as by molding or by additive manufacturing. In some implementations, the unitary object 105-*i* (formed by the combination of the three-dimensional body 110-*i*, the plate 120-*i*, and the connection mechanism 130-*i*) is made of a single material. In other implementations, portions of the unitary object 105-*i* can be made of distinct materials. Moreover, the plates 120-*i* are positioned at the same location along the Z axis when the unitary objects 105-*i* are mounted to the fixtures 140-*i* and the fixtures 140-*i* are fixed to the base 170. Accordingly, a distance along the Z direction between each plate 120-*i* and the registration location on each body 110-*i* remains constant even though each body 110-*i* can have a different scale and/or a geometry. For example, as shown in FIG. 1A, the connection mechanism 130-4 has a shorter extent along the Z direction than the connection mechanism 130-5. This is because the body 110-5 has a smaller scale and therefore a smaller extent along the Z direction than the body 110-4. In some implementations, each three-dimensional body 110-5 is defined by a scale percentage that is between a minimum scale percentage of 0% and a maximum scale percentage. The maximum scale percentage can be as high as 10%, 15%, 18%, 20%, or 30% of the minimum scale percentage.

In some implementations, the base 170 includes a base identification code 171. And, the base identification code 171 includes or stores the unique identification codes IC-i of all of the unitary objects 105-i received within each fixture 140-i arranged or fixed to the base 170. For example, the printer controller 180 can be in communication with a metrology unit 183 that is able to detect or read the base identification code 171. And, from this information, the printer controller 180 determines or receives the data 181 that includes all of the identification codes IC-i. The base identification code 171 can correspond to a barcode such as a two-dimensional matrix barcode (such as a quick response or QR code).

In other implementations, the metrology unit 183 is configured to directly read or detect each individual identification code IC-i on each plate 120-i without having to detect or read the base identification code 171. For example, the metrology unit 183 can be configured to read or detect each individual identification code IC-i on the plates 120-i when the unitary object 105-i is received in and fixed to the fixture 140-i and the fixture 140-i is fixed or mounted on the base 170. The identification code IC-i can correspond to a barcode such as a two-dimensional matrix barcode (such as a quick response or QR code).

Referring to FIGS. 3A-3D, an implementation 305 of a unitary object 105-i is shown in various perspective views. A local XuYuZu coordinate system relative to the unitary object 305 is provided. The local XuYuZu coordinate system may not be aligned with the XYZ coordinate system of the printing system 100 when the unitary object 305 is fixed to the fixture 140-i and the fixture 140-i is fixed to the base 170. Indeed, as shown below, the XuYuZu coordinate system is linearly transposed relative to the XYZ coordinate system.

The unitary object 305 includes a three-dimensional body 310 fixed to a plate 320 by a connection mechanism 330. The general design of the unitary object 305 is described with reference to FIGS. 3A-3D. Nevertheless, other unitary objects can be designed with the general design of the unitary object 305 but can include three-dimensional bodies 310 and connection mechanisms 330 having different scales and/or geometries, as discussed above with reference to FIG. 1A. In this implementation, the three-dimensional body 310 is a body that resembles or is shaped like a head of a human and the connection mechanism 330 includes a plurality of individual and separated posts 331-k, where k corresponds to a set of integers [1, 2, . . . K] and K is a number greater than 1. For simplicity, only posts 331-1, 331-12, 331-20, 331-11, 331-26 are labeled in the inset of FIG. 3D.

Each head 310 includes or is defined by a three-dimensional head base region 315, a three-dimensional scalp region 316, and a three-dimensional face region 317. In this example, the face region 317 corresponds to and/or includes one or more target regions 311-i of the head 310 such that when the unitary object 305 is placed into its fixture (such as the fixture 140-i), the face region 317 (or a particular target region 311-i of the face region 317) is aligned with the printing opening 145-i of the fixture block 142-i when the plate 320 is affixed to the plate guide 150-i. For example, as indicated in FIG. 3A, the face region 317 can include a front target region 311-6 (which is a view facing the front of the face region 317) and two side target regions 311-7a, 311-7b (which are views facing the side of the face region 317). This is shown and discussed in more detail below with reference to an implementation 540 of the fixture 140-i.

Figure 4A:
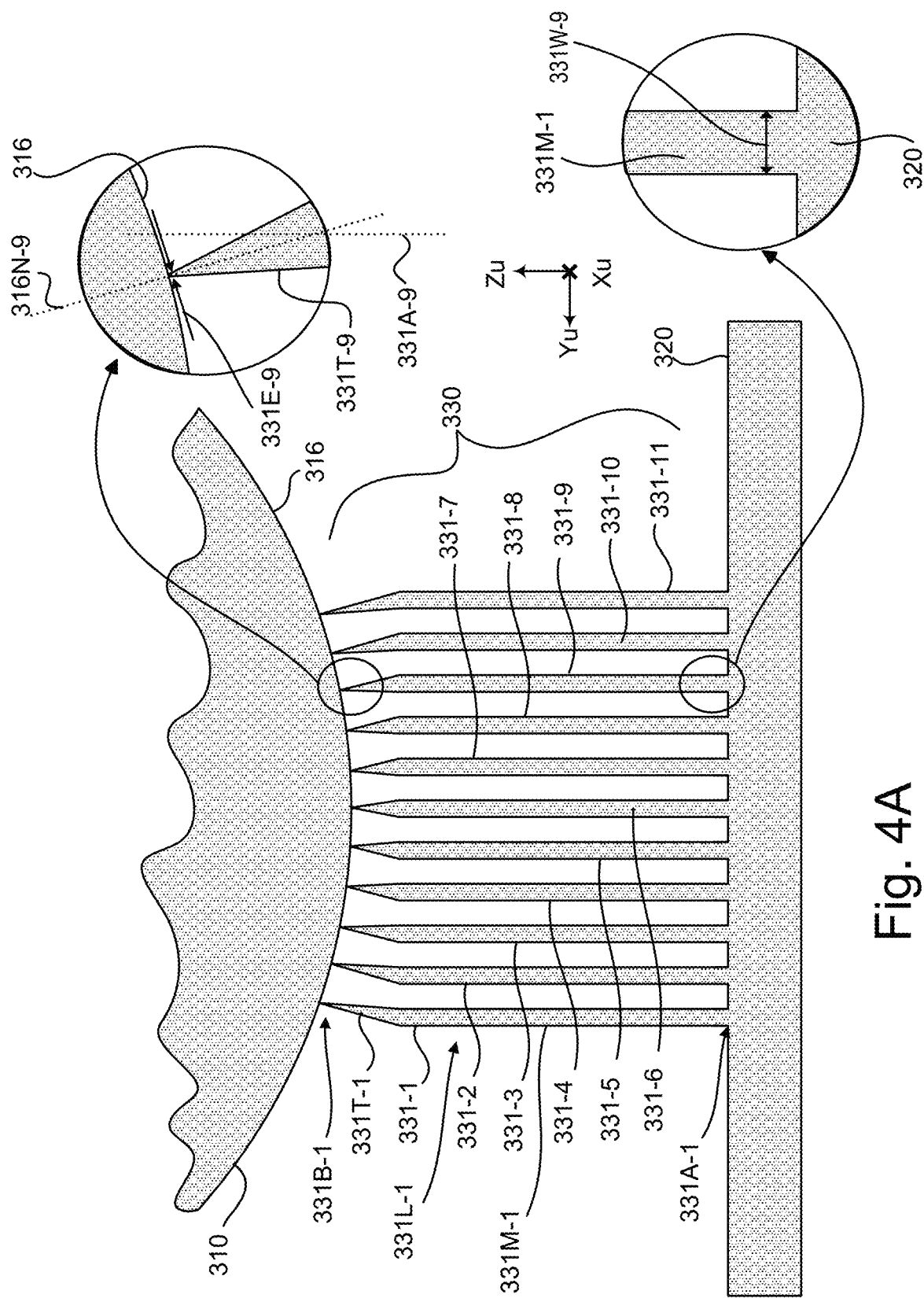
FIG. 4A is a side cross-sectional view showing detail of the connection mechanism between the three-dimensional body and the plate.

Referring also to FIG. 4A, a close-up and side cross-sectional view of the plurality of posts 330, the head 310, and the plate 320 are shown. For clarity, only one row of the posts 330 are shown, namely posts 331-1, 331-2, . . . 331-11 generally arranged along a row that extends along the Yu direction. Other posts are present in planes offset (along the Xu direction) from the plane viewed in FIG. 4A. With reference to the post 331-1, each post 331-1, 331-2, . . . 331-11 extends from a first post end 331A-1 axially along the Zu direction to a second post end 331B-1 defining a post length 331L-1. The first post end 331A-1 is fixed and extends from the plate 320 while the second post end 331B-1 is fixed and extends from the body 310, and specifically from the scalp region 316 of the body 310. The post 331-1 is made up of a main post 331M-1 that extends from the first post end 331A-1 to a tapered shape portion 331T-1 along a post axis (which extends parallel with the Zu axis). The main post 331M-1 can have a cylindrical shape (in that the cross-section along the XuYu plane is circular) and the tapered shape portion 331T-1 can be generally conical. Moreover, as shown in the inset and with reference to the post 331-9, each tapered shape portion 331T-9 is angled relative to the post axis 331A-9 (which is parallel with the Zu axis) so that the tip of the tapered shape portion 331T-9 extends from the scalp region 316 at an angle that is parallel with the normal 316N-9 to the surface at the scalp region 316 at which the post 331-9 extends. This design, in which the tips of the tapered shape portion 331T-1 all extend from the scalp region 316 at the angle parallel with the normal 316N-9 to the surface at the scalp region 316, provides additional strength to the connection or link between the head 310 and the connection mechanism 330.

Moreover, the overall length 331L-1 of the post 331-1 and the length of the tapered shape portion 331T-1, taken along the Zu axis, can be different depending on where the post 331-1 is positioned relative to the scalp region 316. In this way, the length 331L-k and the shape of each post 331-k can be adjusted to accommodate the different shapes and scales of the head 310. Each post 331-k can extend between the first post end 331A-1 to the second post end 331B-1 with a respective length 331L-k that can be, for example, a value that is greater than 2 millimeters (mm), such as a value in a range of 2 mm to 15 mm. Additionally, each post 331-k can extend along a direction perpendicular to the Zu axis and the extend along this perpendicular direction can be given by a width 331W-9 as shown in the inset and with reference to the post 331-9. As discussed above with reference to the main post 331M-1, one or more of the posts 331-k can have a cylindrical shape. If one or more of the posts 331-k are formed having a cylindrical shape, the width of each respective post 331-k (such as the width 331W-9 of the post 331-9) represents a respective diameter that can be, for example, a value that is greater than 0.5 millimeters (mm), such as in a range of 1.0 mm to 2.0 mm or about 1.3 mm.

Additionally, due to the design of the tapered shape portion 331T-1 at the second post end 331B-1, the second post end 331B-1 is easily detachable from the location at which it joins with the scalp region 316. Specifically, the second post end 331B-1 has the tapered shape portion 331T-1 that extends from a wider diameter (at the first post end 331A-1) to a tip that extends from the scalp region 316 of the head 310. As shown in the inset of FIG. 4A, the tip can have an extent 331E-9 that is less than a millimeter (mm), for example, a fraction of a millimeter such as, for example, in a range of 0.1 mm to 0.7 mm, in a range of 0.4 mm to 0.6 mm, about 0.5 mm, or even in a range of 0.1 mm to 0.2 mm, or even less.

Figure 4B:
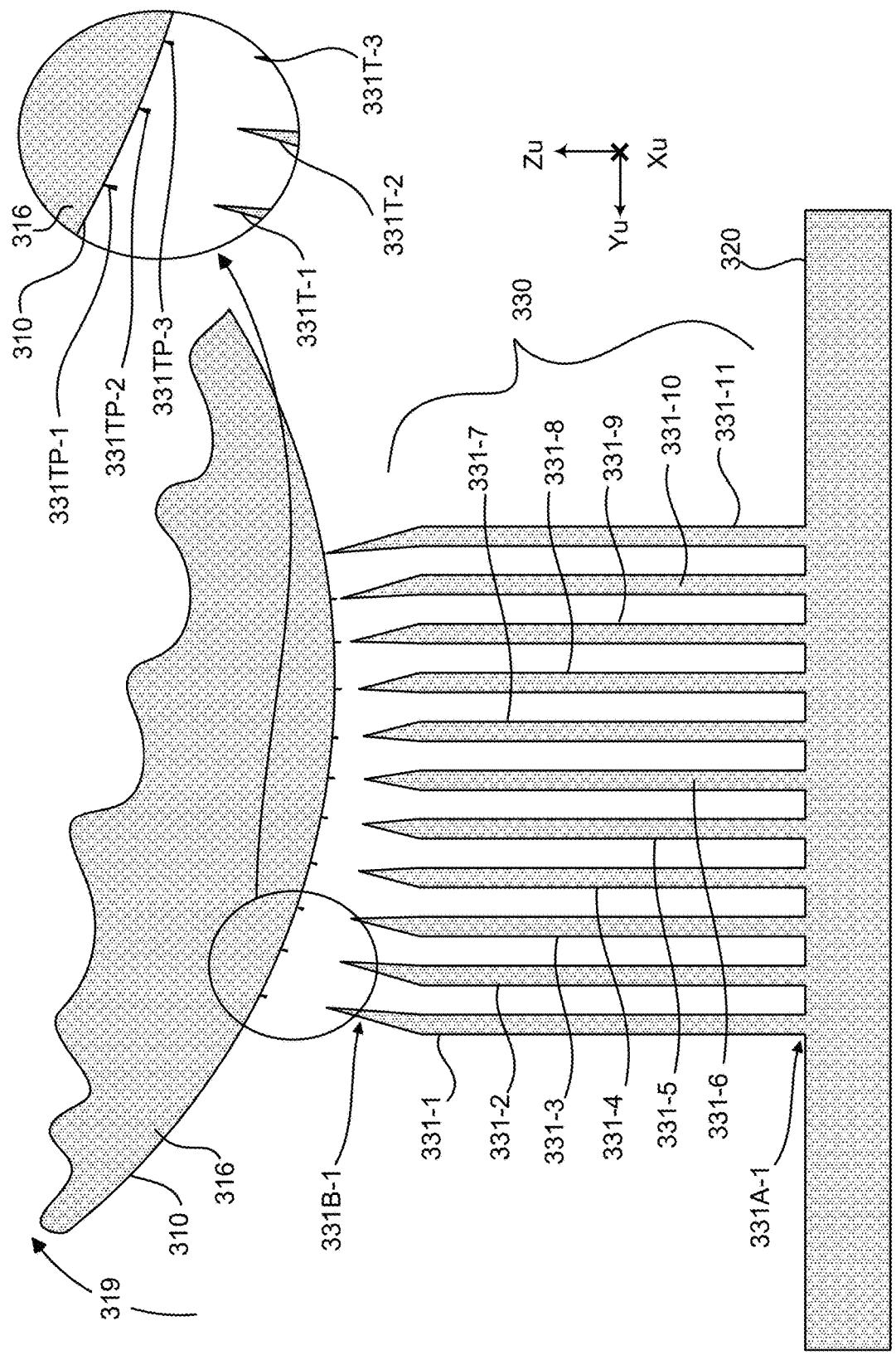
FIG. 4B is a side cross-sectional view of the connection mechanism, three-dimensional body, and plate of FIG. 4A, in which the three-dimensional body has been removed from the connection mechanism.

During processing of the target region (such as the target region 311-i of the face region 317) of the unitary object 305 while in the fixture 140-i, the head 310 remains fixed to the connection mechanism 330 and the plate 320 because the connection mechanism 330 includes a plurality of posts 331-k and because the tips of each tapered shape portion 331T-k extend from the scalp region 316 at the angle parallel with the normal 316N-9 to the surface of the scalp region 316. However, once the processing of the target region 311-i (of the face region 317) is completed, as shown in FIG. 4B, the head 310 can be snapped off from the posts 331-k by twisting or turning the head 310 (depicted by the arrow 319) relative to the posts 331-k. The connection is broken at the interface between each second post end 331B-1 and the scalp region 316 of the head 310 because the extent 331E-9 of the tip at the scalp region 316 is so small compared with the size of the scalp region 316 and the width 331W-9 of the main post 331M-1. As one example, the width 331W-9 (or diameter) of the main post 331M-1 is about 1.5 mm, and the extent 331E-is in the range of about 0.45 mm to about 0.5 mm.

In some implementations, the connection mechanism 330 can include between 8 and 50 posts 331-k, and the number of posts 331-k can depend on the size or scale of the head 310. For example, in some implementations there can be between 8-20 posts 331-k.

The overall number of posts 331-k and the geometric arrangement of the posts 331-k can be different depending on whether the head 310 is a "buck" head that would be covered with hair (such as the wig 214-i of FIG. 2) or a bald head that remains exposed after processing. For example, for a buck head 310, the posts 331-k can be geometrically arranged on the plate 320 to match the unique contour of the buck head 310. As another example, for a bald head 310, the posts 331-k can be arranged in a concentric pattern on the plate 320 and the density can be higher than for the buck head 310 (that is, there can be more posts 331-k per unit area of the plate 320 for the bald head 310 than for the buck head 310).

Moreover, in some implementations, as shown in the inset in FIG. 4B, a tip portion 331TP-1, 331TP-2, 331TP-3 of the respective posts 331-1, 331-2, 331-3 can remain on the surface of the scalp region 316 of the head 310 after the connection is broken at the interface between each second post end 331B-1 and the scalp region 316. The tip portion 331TP-1, 331TP-2, 331TP-3 of the respective post 331-1, 331-2, 331-3 that remains after the connection is broken can be removed (for example, by sanding) from the scalp region 316 of the head 310. In this way, the scalp region 316 of the head 310 can be smooth and lack any visible indication such as indentations, of the previous connections points of the posts 331-k on the scalp region 316 of the head 310. This enables, for example, a bald head 310 to have a smooth scalp region 316 after being separated from the plurality of posts 331-k.

In some implementations, the overall length 331L-k of each post 331-k, taken along the Zu axis, for one unitary object 305 can vary depending on where the post 331-k is positioned relative to the scalp region 316. In this way, the length 331L-k and the shape of each post 331-k can be adjusted to accommodate the different shapes and scales of the head 310. For example, the posts 331-k near the center of the head 310 can be shorter than those at the edge of the head 310 (this is shown in FIG. 4A) to accommodate the curved surface of the head 310.

Referring to FIGS. 5A and 5B, an implementation 540 of the fixture 140-i is shown. The fixture 540 is configured to receive and fix the plate 320 of the unitary object 305 described with reference to FIGS. 3A-4B. The fixture 540 includes a fixture block 542 that defines a printing opening 545. The fixture 540 also includes a cavity 546, and two opposing walls that include a first wall 543A and a second wall 543B.

In FIG. 5A, the fixture 540 is shown from the viewpoint of the printing opening 545 looking down along the +Z direction while in FIG. 5B, the fixture 540 is shown in cross-sectional view 5B-5B. A local XfYfZf coordinate system relative to the fixture 540 is provided. The local XfYfZf coordinate system is aligned with the XYZ coordinate system of the printing system 100 when the fixture 540 is fixed to the base 170.

Figure 6A:
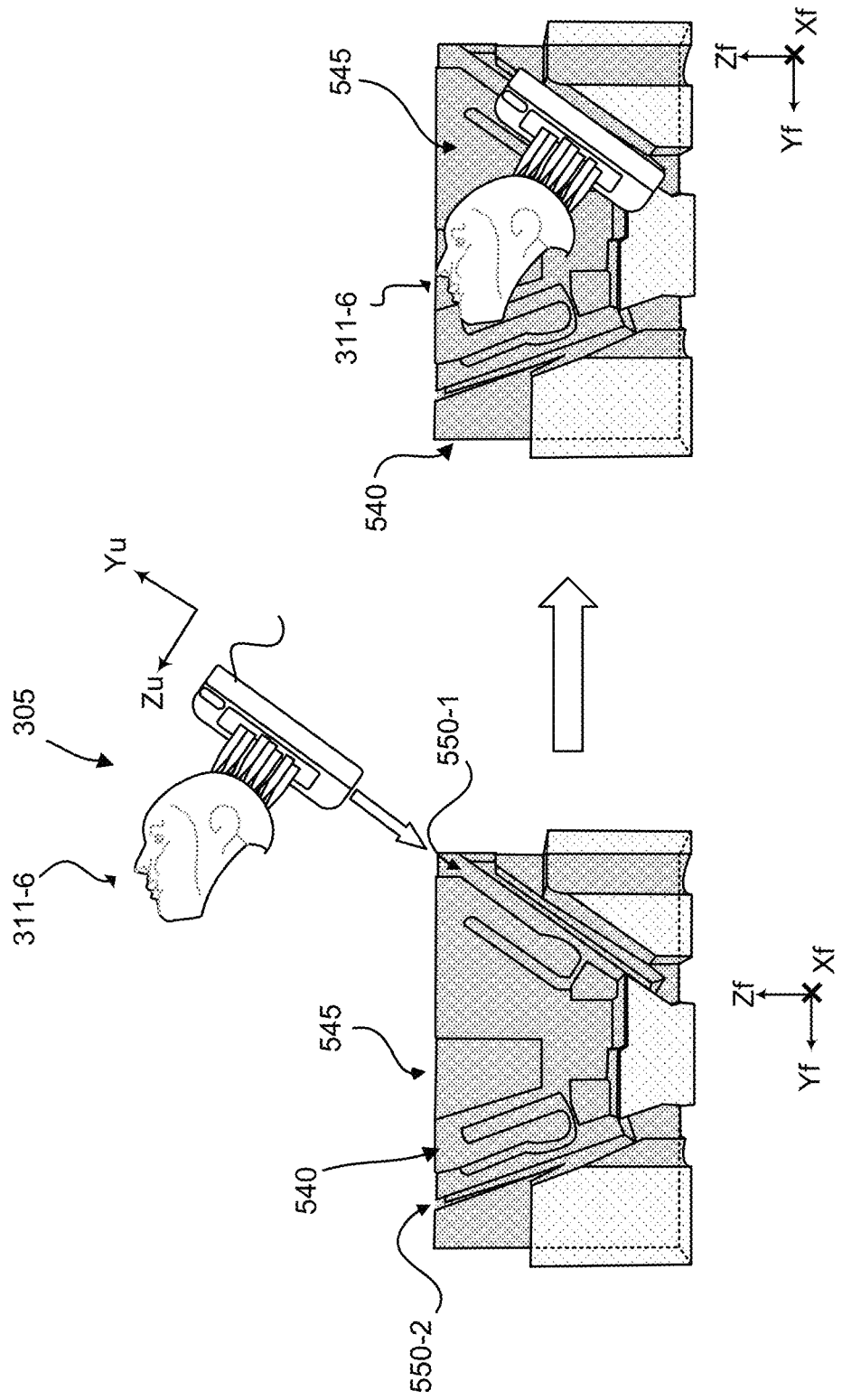
FIG. 6A is a side view of the unitary object of FIGS. 3A-3D inserted into the fixture of FIGS. 5A and 5B using a first plate guide such that a front target region of a face region of the three-dimensional body of the unitary object is aligned within a printing opening of the fixture block when the plate of the unitary object is affixed to (such as fixed to or within) the first plate guide.
Figure 6B:
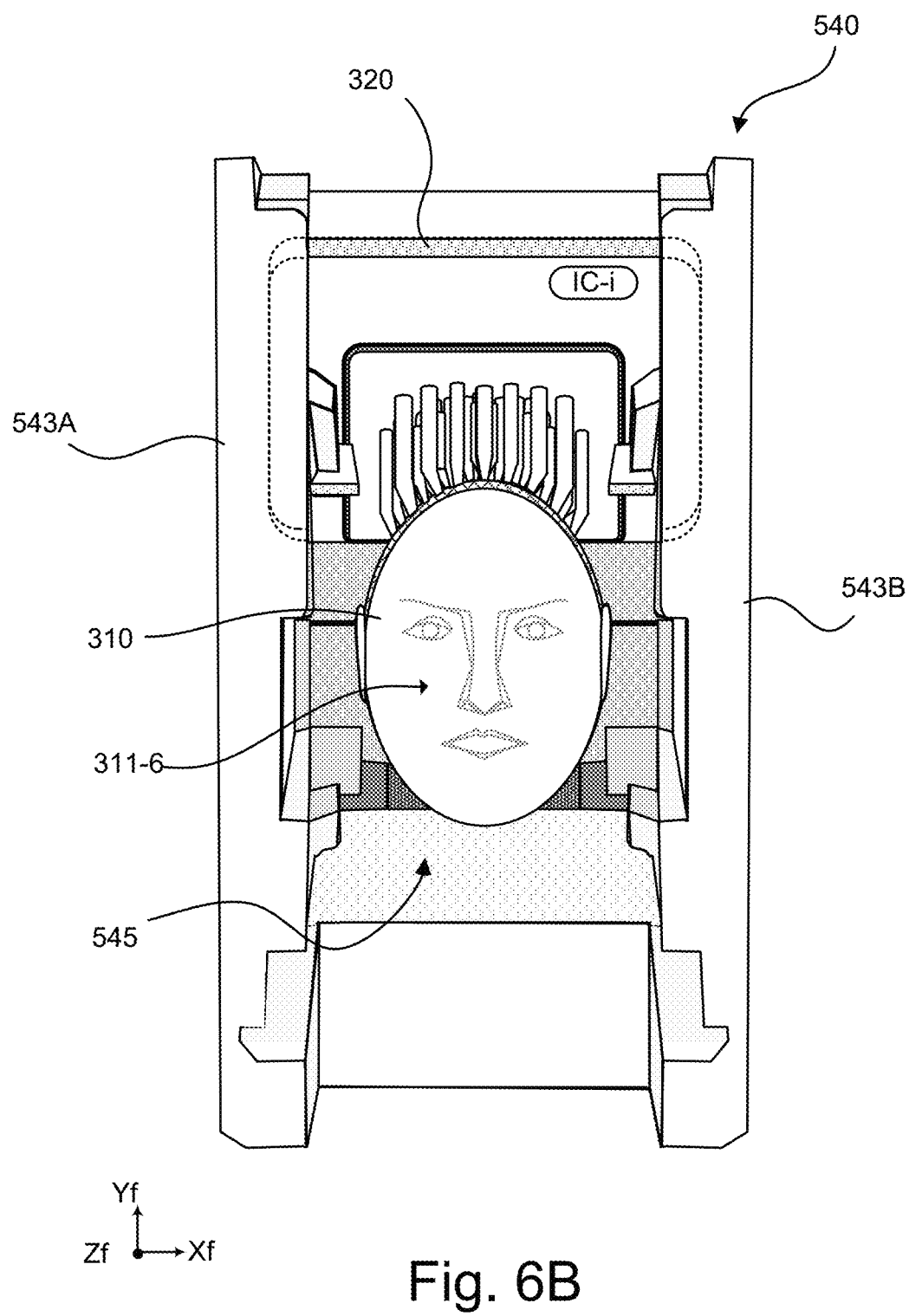
FIG. 6B is a plan view of the unitary object fixed within the fixture of FIG. 6A looking down through a printing opening.
Figure 7A:
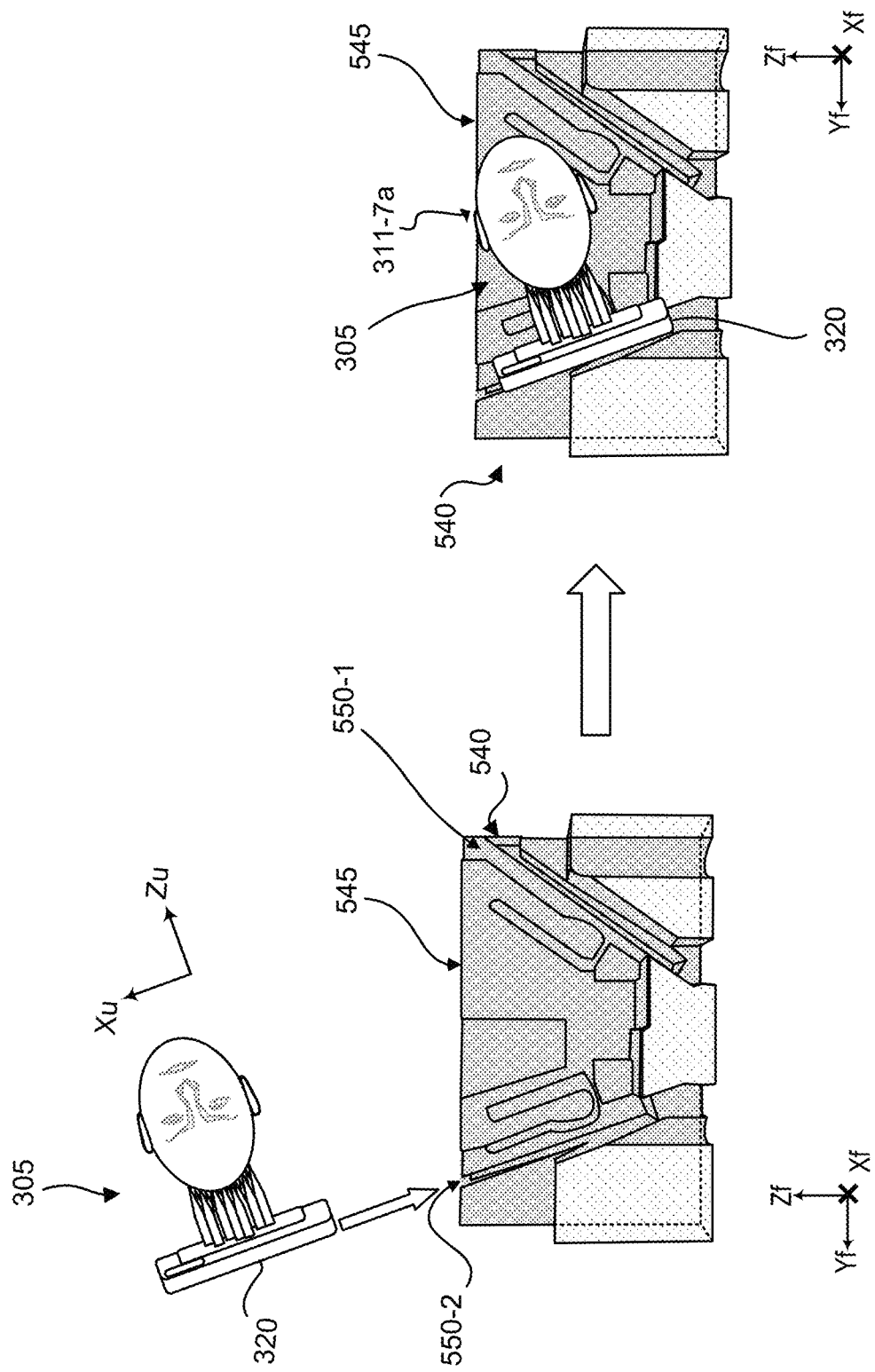
FIG. 7A is a side view of the unitary object of FIGS. 3A-3D inserted into the fixture of FIGS. 5A and 5B using a second plate guide distinct from the first plate guide of FIG. 6A such that a first side target region of the face region of the three-dimensional body of the unitary object is aligned within the printing opening of the fixture block when the plate of the unitary object is affixed to (such as fixed to or within) the second plate guide.
Figure 7B:
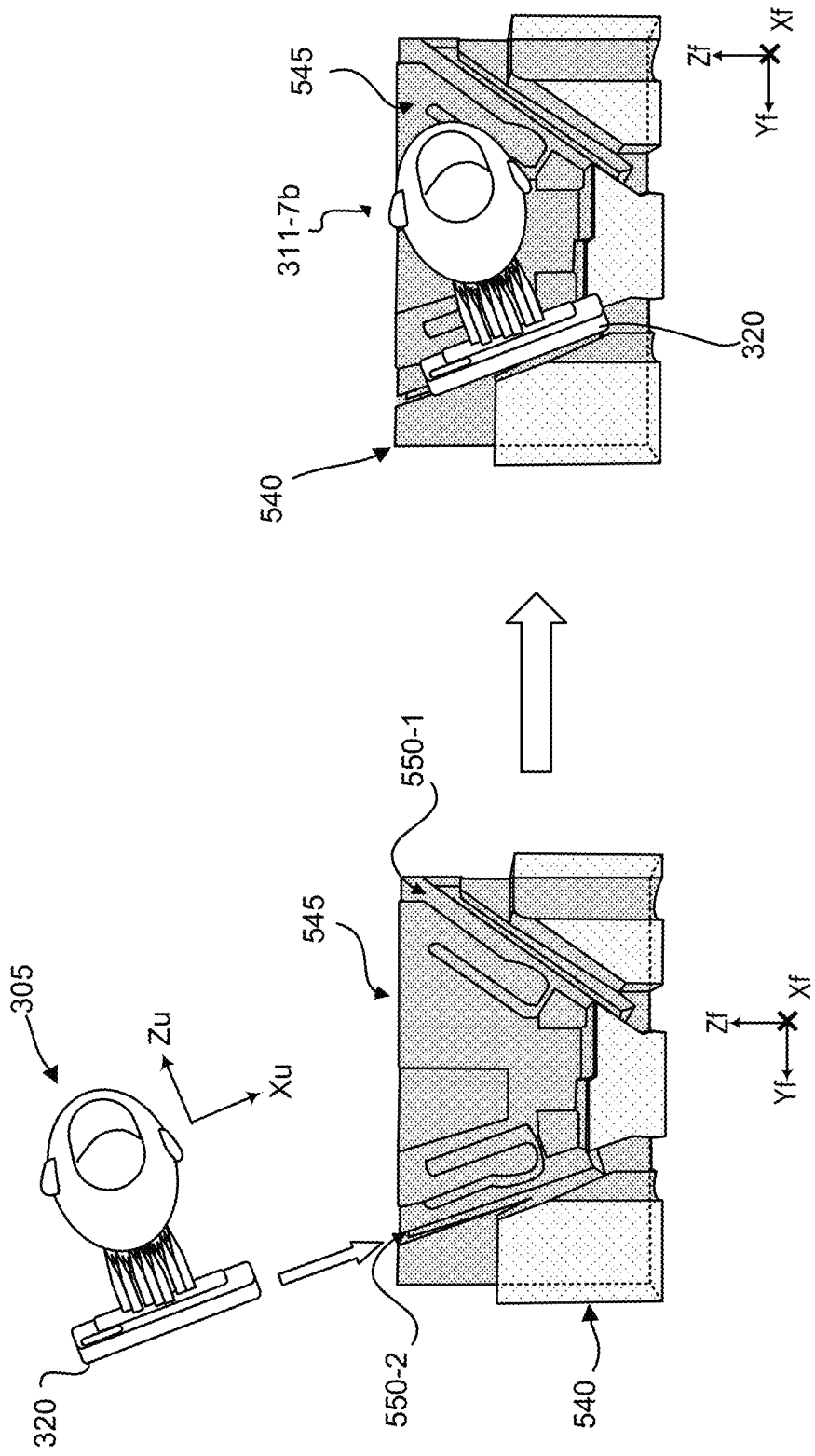
FIG. 7B is a side view of the unitary object of FIGS. 3A-3D inserted into the fixture of FIGS. 5A and 5B using the second plate guide such that a second side target region of the face region of the three-dimensional body of the unitary object is aligned within the printing opening of the fixture block when the plate of the unitary object is affixed to (such as fixed to or within) the second plate guide.

Within the two opposing walls 543A and 543B of the fixture 540, a first plate guide 550-1 and a second plate guide 550-2 are defined. The first plate guide 550-1 and the second plate guide 550-2 are both configured to receive the plate 320 of the unitary object 305 that can be inserted into the cavity 546 of the fixture block 542 by way of the printing opening 545. The first plate guide 550-1 and the second plate guide 550-2 are each defined by two parallel slots within the respective two opposing walls 543A and 543B. In particular, the first plate guide 550-1 is defined by a first slot 551A that is formed within the first wall 543A, and a second slot 551B that is formed within the second wall 543B and is parallel to the first slot 551A. The second plate guide 550-2 is defined by a third slot 552A that is formed within the first wall 543A, and a fourth slot 552B that is formed within the second wall 543B and is parallel to the third slot 552A. As more clearly shown in FIG. 5C, the first plate guide 550-1 and the second plate guide 550-2 can be arranged at different respective angles Θ-1 and Θ-2 relative to the −Yf direction and the +Yf direction, respectively. For example, the angle Θ-1 can be any value between about 50°-60° while the angle Θ-2 can be any value between about 65°-75°. In one specific implementation, the angle Θ-1 is 55° and the angle Θ-2 is 70°. These angles can be chosen to facilitate ink-jet printing certain target regions 111-i of the head 310. For example, the angle Θ-1 can be selected for ink-jet printing of a front target region 311-6 of the head 310, as shown in FIGS. 6A and 6B, while the angle Θ-2 can be selected for ink-jet printing of a side target region 311-7 of the head 310, as shown in FIGS. 7A and 7B. This is discussed next.

As shown in FIGS. 6A and 6B, the plate 320 (of the unitary object 305) can be inserted into the first plate guide 550-1 at the first angle Θ-1 relative to the −Yf direction, or, as shown in FIGS. 7A and 7B, the plate 320 can be inserted into the second plate guide 550-2 at the second angle Θ-2 relative to the +Yf direction. The difference in the angles Θ-1 and Θ-2 of the first plate guide 550-1 and the second plate guide 550-2, respectively, therefore permits two different configurations of the head 310 within the printing opening 545 of the fixture block 542, as shown on the right side of FIGS. 6A, 7A, and 7B.

In FIGS. 6A and 6B, the front target region 311-6 of the head 310 is aligned with the printing opening 545 of the fixture 540. Thus, in this configuration, when the fixture 540 is placed on the base 170, the ink dispenser 190 has access to the front target region 311-6 of the face region 317 for printing. In FIG. 7A, the side target region 311-7a of the head 310 is aligned with the printing opening 545 of the fixture 540. Thus, in the configuration of FIG. 7A, when the fixture 540 is placed on the base 170, the ink dispenser 190 has access to the side target region 311-7a of the face region 317 for printing. On the other hand, in FIG. 7B, the unitary object 305 has been rotated by 180° about the Zu axis relative to the unitary object 305 in FIG. 7A. Thus, in FIG. 7B, the side target region 311-7b of the head 310 is aligned with the printing opening 545 of the fixture 540. And, in the configuration of FIG. 7B, when the fixture 540 is placed on the base 170, the ink dispenser 190 has access to the side target region 311-7B of the face region 317 for printing.

The plate guide 550-1 or 550-2 is what determines the registration location because the location of the plate 320, when fixed within the fixture 540, is determined by the plate guide 550-1/550-2. Referring again to FIGS. 5A and 5B, the plate guides 550-1 and 550-2 can also include respective biasing devices 553A/B and 554A/B. The biasing device 554A fixes the plate 320 within the slot 552A; the biasing device 554B fixes the plate 320 within the slot 552B, the biasing device 553A fixes the plate 320 within the slot 551A, and the biasing device 553B fixes the plate 320 within the slot 551B.

In some implementations, the plate 320 is a symmetrical shape such as a square shape (see FIG. 3C) such that the plate 320 can be rotated about the Zu axis by 90 degrees relative to the position in FIGS. 6A and 6B to obtain the configuration shown in FIG. 7A or rotated about the Zu axis by −90 degrees relative to the position in FIGS. 6A and 6B to obtain the configuration shown in FIG. 7B. In this way, each of the target regions 311-6, 311-7a, 311-7b of the head 310 can be aligned with the printing opening 545 of the fixture 540, and when the fixture 540 is placed on the base 170, the ink dispenser 190 has access to each of these target regions for printing.

Figure 8A:
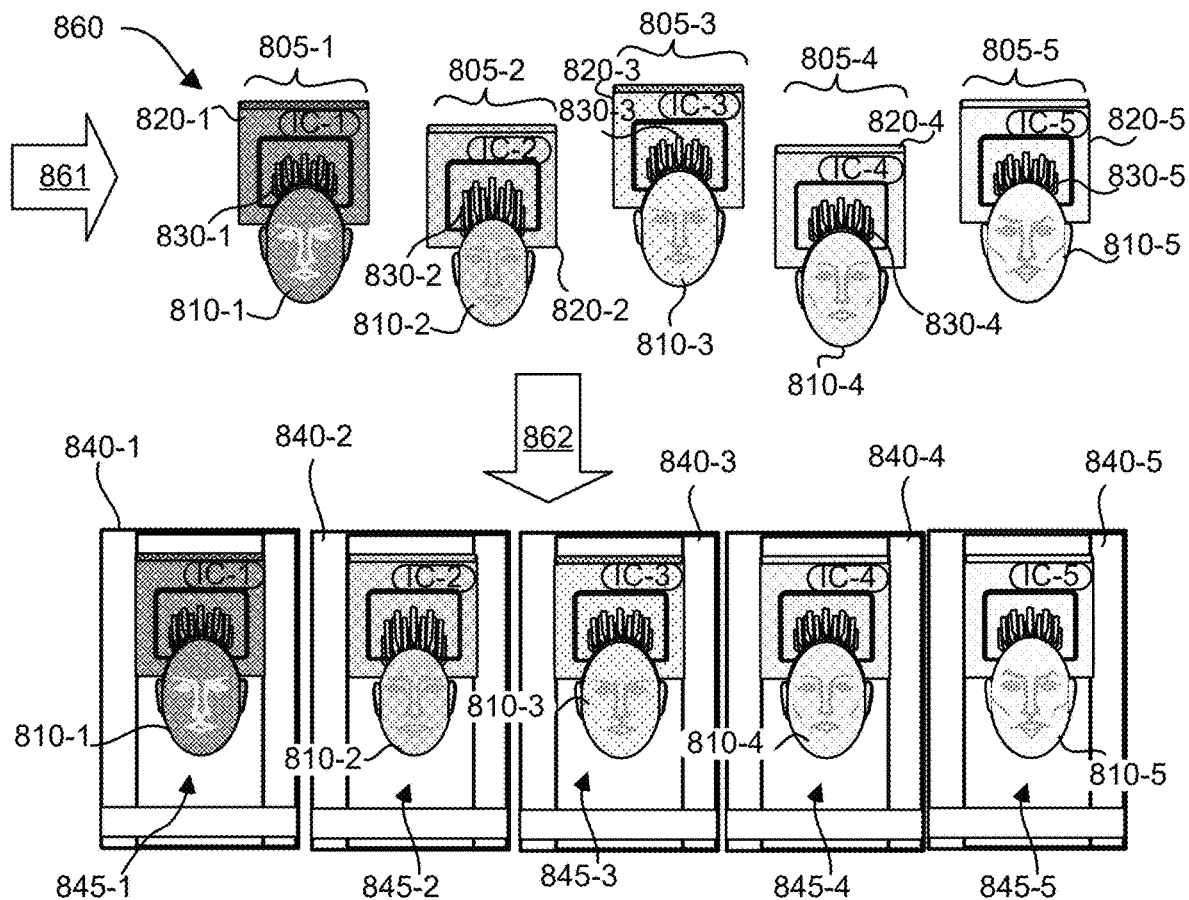
FIG. 8A is a schematic diagram of a procedure performed by the printing system of FIG. 1A for designing a plurality of three-dimensional bodies such as the three-dimensional bodies of FIGS. 1A-8B.
Figure 8B:
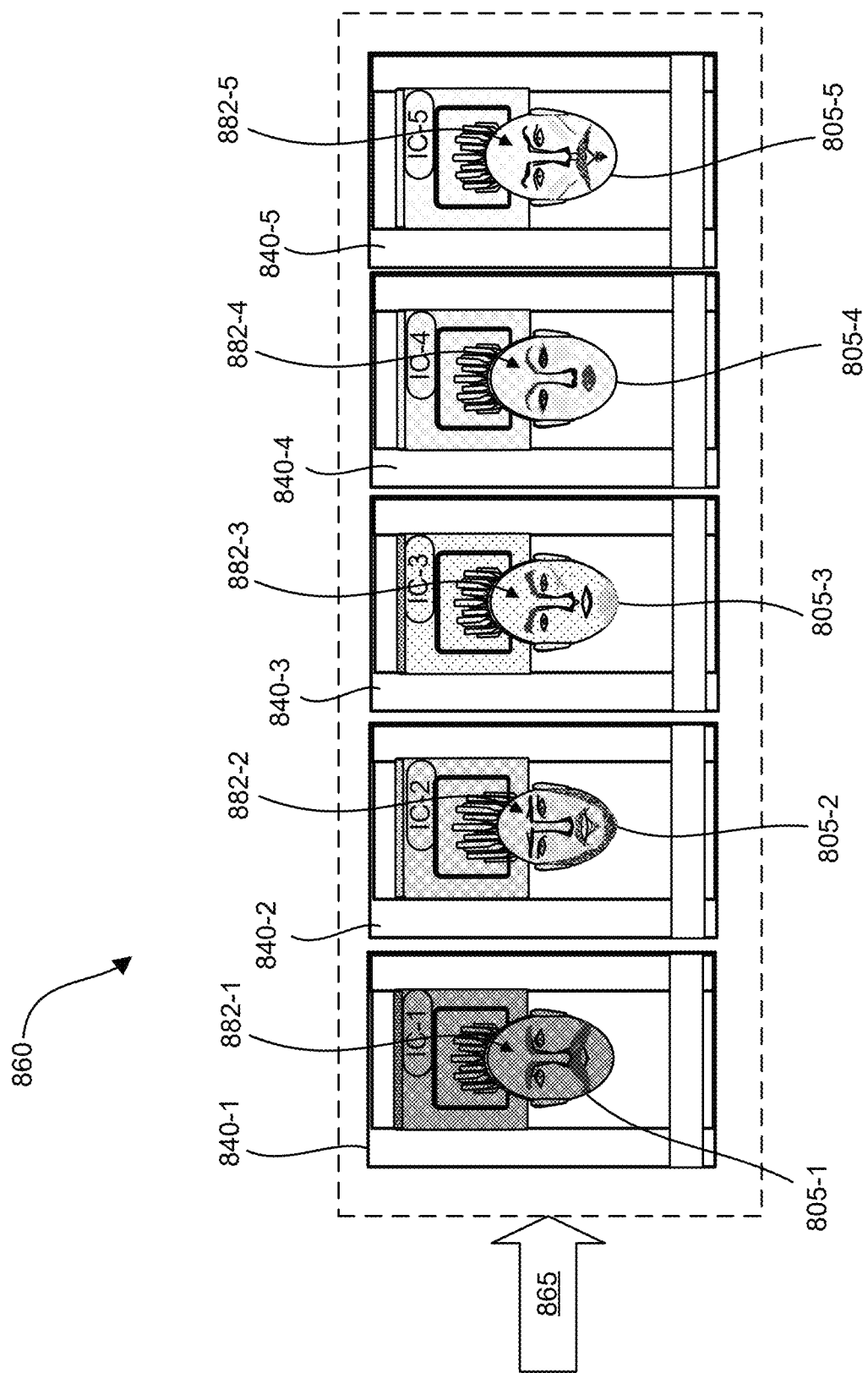
FIG. 8B is a schematic diagram of steps of the procedure of FIG. 8A performed by the printing system of FIG. 1A for designing a plurality of three-dimensional bodies such as the three-dimensional bodies of FIGS. 1A-7B, and showing topographical printed designs on the three-dimensional bodies.

Referring to FIGS. 8A-8C, a method 860 is performed for designing a plurality of uniquely-shaped three-dimensional bodies 810-1, 810-2, 810-3, 810-4, 810-5 (written generally as 810-i). While five bodies are shown in the example of FIGS. 8A-8C, it is possible for the method 860 to be used to produce fewer than five or more than five bodies. The bodies 810-i can correspond to the bodies 110-i or a plurality of bodies that are each designed generally like the body 310. In this example, the bodies 810-i correspond to heads 310 that have different scales and/or geometries. The method 860 includes forming a plurality of unitary objects 805-1, 805-2, 805-3, 805-4, 805-5 (written generally as 805-i) (861). Each unitary object 805-i includes the respective head 810-i as well as the respective connection mechanism 830-i that attaches the head to a respective plate 820-i. And, because the heads 810-i have different scales and/or geometries, each connection mechanism 830-i is designed with a different scale to accommodate these differences. Five unitary objects 805-1, 805-2, 805-3, 805-4, 805-5 are shown for each corresponding body 810-1, 810-2, 810-3, 810-4, 810-5. But, as noted, more than five or fewer than five unitary objects can be formed depending on how many bodies 810-i are being produced. As discussed above, each unitary object 805-i is associated with a unique identification code IC-i (in this case, IC-1, IC-2, IC-3, IC-4, IC-5). The unitary objects 805-1, 805-2, 805-3, 805-4, 805-5 can be formed by any suitable technique such as by additive manufacturing. One or more materials can be used to form the unitary objects 805-1, 805-2, 805-3, 805-4, 805-5. On the other hand, if a single material is used to form the unitary object 805-1, then all of the regions of the unitary object 805-1 have a uniform color.

Next, each unitary object 805-1, 805-2, 805-3, 805-4, 805-5 is fixed to a respective fixture 840-1, 840-2, 840-3, 840-4, 840-5 (862). For example, the plate 820-1, 820-2, 820-3, 820-4, 820-5 of each unitary object 805-1, 805-2, 805-3, 805-4, 805-5 is fixed to a plate guide (not shown clearly) defined in the associated fixture 840-1, 840-2, 840-3, 840-4, 840-5 such that a target region of the body (head 810-i) is positioned in a respective printing opening 845-1, 845-2, 845-3, 845-4, 845-5 of the fixture 840-1, 840-2, 840-3, 840-4, 840-5, as discussed above. Next, the fixtures 840-1, 840-2, 840-3, 840-4, 840-5 (collectively referred to as 840-i in FIG. 8A) are arranged on the base 170 (863). The printer controller 180 detects or reads the identification code IC-i of each unitary object 805-1, 805-2, 805-3, 805-4, 805-5 positioned on the base 170 (864). For example, the printer controller 180 can receive the data 181 that includes each of the identification codes IC-1, IC-2, IC-3, IC-4, IC-5 associated with each unitary object 805-1, 805-2, 805-3, 805-4, 805-5. The printer controller 180 instructs the ink dispenser 190 to apply ink or paint 892 to the target region of each head 810-1, 810-2, 810-3, 810-4, 810-5 (865). By applying the ink or paint 892 to each target region of each head 810-1, 810-2, 810-3, 810-4, 810-5 (865), a unique respective topographical design 882-1, 882-2, 882-3, 882-4, 882-5 (collectively referred to as 882-i in FIG. 8B) is created on the target region of each three-dimensional body or head 810-1, 810-2, 810-3, 810-4, 810-5 (associated with each unitary object 805-1, 805-2, 805-3, 805-4, 805-5) positioned in the printing opening 845-1, 845-2, 845-3, 845-4, 845-5 of its respective fixture 840-1, 840-2, 840-3, 840-4, 840-5 (see FIG. 8B). As discussed above, this unique topographical design 882-i is associated with the detected unique and respective identification code IC-i of the unitary object 805-1, 805-2, 805-3, 805-4, 805-5 that includes that three-dimensional body or head.

In FIG. 8B, an example is shown after printing of the unique topographical design 882-i is completed (at step 865) on the target region of each three-dimensional body 810-1, 810-2, 810-3, 810-4, 810-5 associated with a respective unitary object 805-1, 805-2, 805-3, 805-4, 805-5. The unique topographical designs 882-1, 882-2, 882-3, 882-4, 882-5 can be created by the ink or paint 892 that is applied on the surface of the target region of each of the respective heads 810-1, 810-2, 810-3, 810-4, 810-5 associated with each unitary object 805-1, 805-2, 805-3, 805-4, 805-5. The unique topographical design 882-i can include unique colors for specific features on each unitary object 805-1, 805-2, 805-3, 805-4, 805-5 including, for example, eyes, cheeks, brows, lips, beard (if one is present), mustache (if one is present), or scars (if present). Additionally, each respective unique topographical design 882-i can also be different in shape and style and include a plurality of different colors.

In the example shown in FIG. 8B, the unique topographical designs 882-1, 882-2, 882-3 and 882-5 printed on the three-dimensional bodies associated with each respective unitary object 805-1, 805-2, 805-3, and 805-5 can have a beard, mustache, or both that are a unique shape, style, and color from one another. For example, the topographical design 882-1 includes a dark brown mustache and the topographical design 882-2 includes a grey beard and mustache with black speckles. The topographical design 882-3 includes a white or gray beard. The topographical design 882-5 includes a yellow and black mustache and a beard patch. Moreover, the unique topographical designs 882-1, 882-2, 882-3, 882-4, 882-5 printed on the three-dimensional bodies associated with each respective unitary object 805-1, 805-2, 805-3, 805-4, 805-5 can each have uniquely shaped and colored brows and different colored eyes. In particular, the topographical design 882-1 includes thick brown eye brows and green eyes, the topographical design 882-2 includes thin black brows and dark blue eyes, the topographical design 882-3 includes thick arched blue brows and light brown eyes, the topographical design 882-4 includes arched blonde brows and dark brown eyes, and the topographical design 882-5 includes thin arched black brows and light blue eyes. The topographical design 882-4 also includes red lips. The topographical design 882-2 includes a light mauve cheek color, the topographical design 882-4 includes a medium mauve cheek color, and the topographical design 882-5 includes a light brown check color. The unique topographical design 882-3 printed on the three-dimensional body associated with the unitary object 805-3 also has a scar on its cheek.

The heads 810-1, 810-2, 810-3, 810-4, 810-5 can be made of materials having different colors so that the faces depicted on the bodies 810-1, 810-2, 810-3, 810-4, 810-5 can have different skin tones. For example, the head 810-1 (and the respective unitary object 805-1) is made of a material having the darkest color than the materials used for the other heads, while the head 810-5 (and the respective unitary object 805-5) is made of a material that is lighter than the material of the unitary object 805-1. The unitary object 805-5 is made of a material that has a more yellow hue than the material that is used for the unitary object 805-4. There can be other materials and colors used for the unitary objects 805-1, 805-2, 805-3, 805-4, 805-5 than what are shown. The material and color for a particular unitary object can be selected at step 861 prior to the forming of that unitary object and can be based on the skin color of the person whose face was scanned for reproduction of the face on a head that can be fixed to a toy figure or doll.

Once the printing is completed after step 865, the fixtures 840-1, 840-2, 840-3, 840-4, 840-5 are removed from the base 170 and the respective unitary objects 805-1, 805-2, 805-3, 805-4, 805-5 are removed from their fixtures 840-1, 840-2, 840-3, 840-4, 840-5; then, the head 810-1, 810-2, 810-3, 810-4, 810-5 of each unitary object 805-1, 805-2, 805-3, 805-4, 805-5 is removed from its respective plate 820-1, 820-2, 820-3, 820-4, 820-5 by disconnecting the respective connection mechanism 830-1, 830-2, 830-3, 830-4, 830-5 from the respective head 810-1, 810-2, 810-3, 810-4, 810-5, as shown in FIG. 4B (866).

As discussed above, when the fixtures 840-1, 840-2, 840-3, 840-4, 840-5 are arranged on the base 170 at 863, because of the uniform design of the fixtures 840-1, 840-2, 840-3, 840-4, 840-5 and the design of the connection mechanism 830-1, 830-2, 830-3, 830-4, 830-5 of each unitary object 805-1, 805-2, 805-3, 805-4, 805-5, a registration location for topographical printing on each three-dimensional body (head 810-1, 810-2, 810-3, 810-4, 810-5) is at the same printing plane (XY plane). The printer controller 180 accesses the topographical designs 882-1, 882-2, 882-3, 882-4, 882-5 for each head 810-1, 810-2, 810-3, 810-4, 810-5 such that the instructions sent to the ink dispenser 190 provide a continuous printing process across all of the unitary objects 805-1, 805-2, 805-3, 805-4, 805-5 despite the fact that each of the heads 810-1, 810-2, 810-3, 810-4, 810-5 has a unique shape compared with the other heads 810-1, 810-2, 810-3, 810-4, 810-5 in the plurality of unitary objects 805-*i*.

Figure 9:
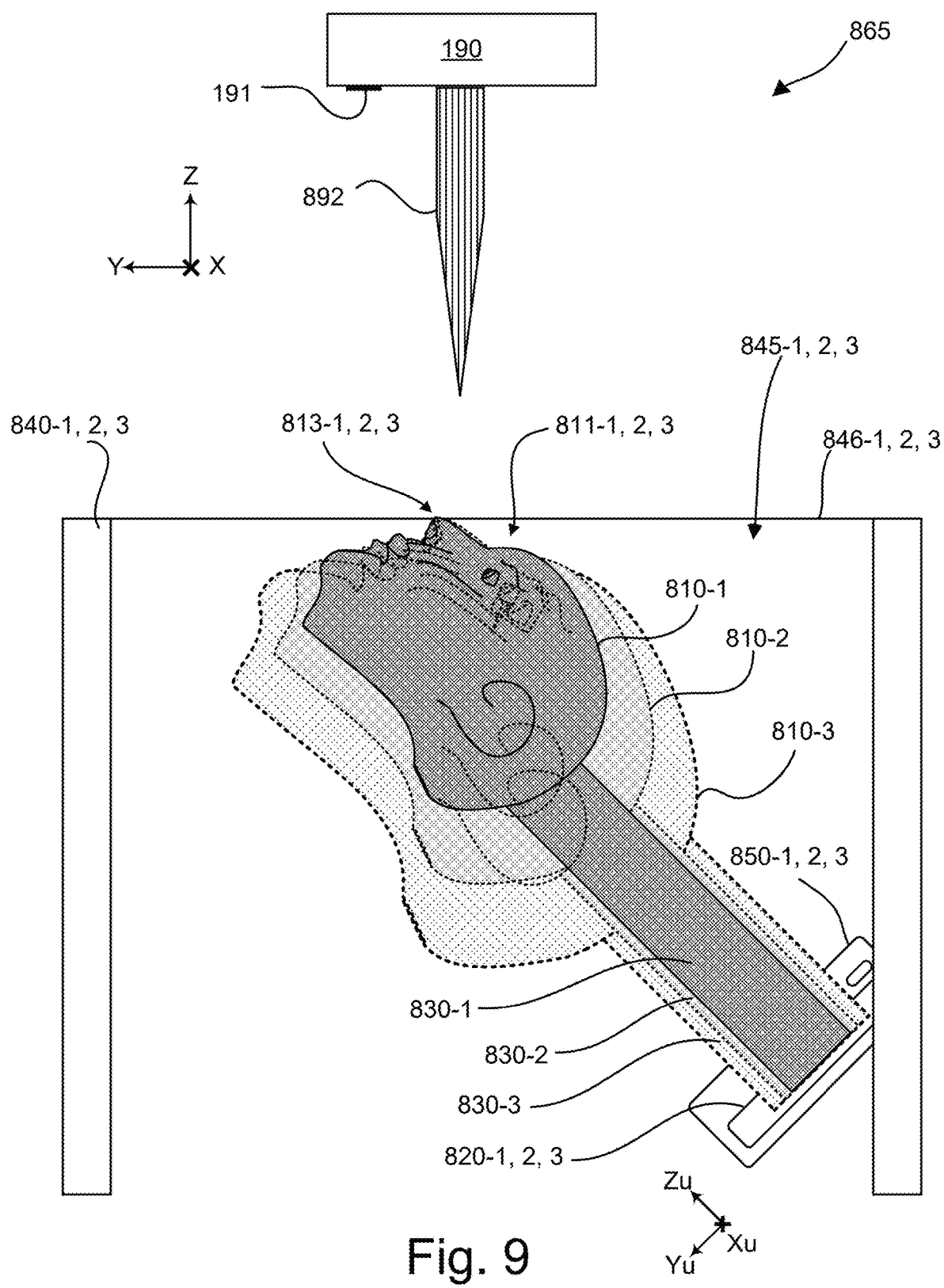
FIG. 9 is a view along the X axis of the printing system of FIG. 1A and FIG. 8A showing the arrangement of the three-dimensional bodies and their reference areas overlapping in the XY plane.

FIG. 9 shows the alignment of three-dimensional bodies (or heads) 810-1, 810-2, 810-3 of the plurality of unitary objects 805-1, 805-2, 805-3. Each of the three-dimensional bodies 810-1, 810-2, 810-3 is connected to the respective plates 820-1, 820-2, 820-3 by the respective connection mechanisms 830-1, 830-2, 830-3. As discussed above, the three-dimensional bodies 810-1, 810-2, 810-3 have different scales and/or geometries. To accommodate the different scales and/or geometries of each three-dimensional body 810-1, 810-2, 810-3, the respective connection mechanisms 830-1, 830-2, 830-3 are made of different scales according to the size of the respective three-dimensional bodies 810-1, 810-2, 810-3 to which they are fixed. The view in FIG. 9 is looking down the X axis and the Z axis is directed up. The heads 810-2 and 810-3 are shown in dashed lines because they are behind the body 810-1 in this view. Only a single plane 846-1, 846-2, 846-3 that defines each printing opening 845-1, 845-2, 845-3 of each of the fixtures 840-1, 840-2, 840-3 is depicted to increase clarity. When the unitary objects 805-1, 805-2, 805-3 are fixed or mounted within in their respective fixtures 840-1, 840-2, 840-3, the plates 820-1, 820-2, 820-3 are fixed to their respective plate guides 850-1, 850-2, 850-3. Looking down the X axis, each of the target regions 811-1, 811-2, 811-3 are aligned with the respective printing openings 845-1, 845-2, 845-3. Moreover, registration areas 813-1, 813-2, 813-3 in each target region 811-1, 811-2, 811-3 are aligned along the X axis as well. The registration areas 813-1, 813-2, 813-3 are the locations in each target region 811-1, 811-2, 811-3 that are aligned such that a localized registration location R-1, R-2, R-3 is the same for all of the target regions 811-1, 811-2, 811-3 and also for the primary registration location RO. In this example, the registration areas 813-1, 813-2, 813-3 in the target regions 811-1, 811-2, 811-3 correspond to the feature (the tip of the nose) that protrudes the most along the Z axis.

The printing system 100 and method 860 enables the topographical printing of a plurality of faces on respective heads, where each face and head has a unique topographical shape, scale, and design. The printing system 100 and method 860 can be useful in an apparatus in which persons have their faces scanned for reproduction on a toy figure or doll. In such an apparatus, each face that is scanned has a unique shape, geometry, and topographical features. In the first step, each three-dimensional head is formed at step 861 as a part of its unitary object. The connection mechanism is adjusted in scale/size to accommodate for the different shapes of the heads. And, the unique shape, geometry, topographical features of the person are associated with the unique identification code IC-*i*, which is assigned to the person when the person's face and/or head is scanned, and the unitary object formed for that person includes the code IC-*i* during the entire method 860. In this way, at step 864, the printer controller 180 knows which fixture is associated with which person (because the cod IC-*i* is read or detected by the printer controller 180) and the instruction to the ink dispenser 190 takes this into account so that the ink dispenser 190 prints the unique topographical design 182-*i* associated with the IC-*i* for that particular head.

Other implementations are within the scope of the following claims.

In other implementations, in addition to the plurality of uniquely-designed unitary objects 105-*i*, there can be identically-designed unitary objects that are printed at the same time as the uniquely-designed unitary objects 105-*i* on the base 170.

What is claimed is:
1. A printing system comprising:
 a plurality of unitary objects each having a unique identification code, with each unitary object including a uniquely-shaped three-dimensional body fixed to a plate by a connection mechanism;

a plurality of fixtures arranged on a base, each fixture comprising:
a fixture block defining a printing opening; and
a plate guide defined in the fixture block and configured to receive the plate;
wherein a target region of the three-dimensional body is aligned within the printing opening of the fixture block when the plate is fixed within the plate guide; and
a printer controller configured to:
detect the unique identification code of each unitary object; and
control an ink dispenser to print a unique topographical design on each aligned target region of each three-dimensional body, the unique topographical design being associated with the detected unique identification code.

2. The printing system of claim 1, wherein the unique identification code is a unique combination of numbers, letters, alphanumeric characters, characters, symbols, or matrix barcodes.

3. The printing system of claim 1, wherein the three-dimensional body is a three-dimensional head of a toy figure.

4. The printing system of claim 3, wherein the three-dimensional head includes one or more unique facial features.

5. The printing system of claim 3, wherein the three-dimensional head is defined by a three-dimensional head base region, a three-dimensional scalp region, and a three-dimensional face region; and the connection mechanism extends from the scalp region or the head base region.

6. The printing system of claim 1, wherein the connection mechanism comprises a plurality of posts, and each post extends from a respective first post end to a respective second post end, with the first post end fixed at a location of the plate and the second post end detachably fixed to a location of the body.

7. The printing system of claim 6, wherein the second post end is formed with a tapered shape that permits the second post end to be detached from the body.

8. The printing system of claim 7, wherein each post includes a main post that extends from the first post end to the tapered shape along a post axis, and each tapered shape is angled relative to the post axis of the main post, the relative angle between the tapered shape and the post axis depending on the normal to the surface of the body at which the second post end is fixed.

9. The printing system of claim 6, wherein each post extends along a Zu post axis between the plate location and the body location, and a length of each post along the Zu post axis depends on the location of the body at which the post is fixed relative to the plate at which the post is fixed.

10. The printing system of claim 1, wherein the printer controller being configured to control the ink dispenser comprises registering a distance between the ink dispenser and a registration location in the printing opening.

11. The printing system of claim 10, wherein, when each plate is received in its respective plate guide, a registration region of the body is aligned with the registration location in the printing opening.

12. The printing system of claim 11, wherein the registration locations in the printing openings of the fixture blocks are at the same location relative to the ink dispenser when aligned with the ink dispenser during printing.

13. The printing system of claim 1, wherein each connection mechanism comprises a plurality of posts and each body is fixed to its respective plate by the posts, and the number of posts in the connection mechanism is between 10 and 50.

14. The printing system of claim 1, wherein the plate guide is configured to receive the plate in one or more orientations.

15. The printing system of claim 1, wherein the unique identification code is a visible code located on the plate of each unitary object.

16. The printing system of claim 1, wherein the plate of each unitary object is associated with a unique manufacturing recipe that comprises information about hair associated with the three-dimensional body, information about a scale and/or geometry of the three-dimensional body, information about a toy figure to which the three-dimensional body is fixed, and the unique identification code.

17. The printing system of claim 1, wherein the base includes a base identification code, the base identification code comprises each unique identification code of each unitary object received within each fixture arranged on the base.

18. The printing system of claim 1, wherein the unique topographical design is based on a two-dimensional print design.

19. The printing system of claim 1, wherein each three-dimensional body is defined by a scale percentage that is between a minimum scale percentage of 0% and a maximum scale percentage.

20. The printing system of claim 1, wherein the printer controller is configured to detect the unique identification code of the unitary object when the plate associated with the unitary object is received in the fixture block and the fixture is arranged on the base.

21. The printing system of claim 7, wherein the tip of the tapered shape is smaller than about 1 millimeter (mm), smaller than 0.5 mm, smaller than 0.1 mm, or smaller than 0.05 mm.

22. The printing system of claim 7, wherein the second post end has a width, the width is larger than about 0.5 millimeter (mm), larger than 1 mm, larger than 1.5 mm, larger than 2 mm, larger than 2.5 mm, or larger than 3 mm.

23. The printing system of claim 14, wherein an orientation of the body in the fixture is defined by an orientation of its associated plate received in the plate guide, the body orientation determining which one or more target regions of the body are aligned within the printing opening of the fixture block.

24. The printing system of claim 17, wherein the printer controller is configured to detect the base identification code and control the ink dispenser to print a unique topographical design associated with each unique identification code included in the base identification code.

25. The printing system of claim 19, wherein the maximum scale percentage is 18%.

* * * * *